(12) United States Patent
Peattie et al.

(10) Patent No.: US 10,155,654 B2
(45) Date of Patent: Dec. 18, 2018

(54) VESSEL OVERFILL PROTECTION SYSTEM

(71) Applicant: WALNAB PTY LTD, New South Wales (AU)

(72) Inventors: Adam Peattie, New South Wales (AU); Emil-Dan Dragomirescu, New South Wales (AU)

(73) Assignee: WALNAB PTY LTD (AU)

( * ) Notice: Subject to any disclaimer, the term of this patent is extended or adjusted under 35 U.S.C. 154(b) by 40 days.

(21) Appl. No.: 15/536,789

(22) PCT Filed: Dec. 17, 2015

(86) PCT No.: PCT/AU2015/050802
§ 371 (c)(1),
(2) Date: Jun. 16, 2017

(87) PCT Pub. No.: WO2016/094952
PCT Pub. Date: Jun. 23, 2016

(65) Prior Publication Data
US 2017/0349428 A1    Dec. 7, 2017

(30) Foreign Application Priority Data

Dec. 17, 2014 (AU) .............................. 2014905114

(51) Int. Cl.
*B60K 15/03* (2006.01)
*B65D 90/26* (2006.01)
(Continued)

(52) U.S. Cl.
CPC .............. *B67D 7/365* (2013.01); *B60K 15/03* (2013.01); *B65D 90/26* (2013.01); *F16K 21/18* (2013.01);
(Continued)

(58) Field of Classification Search
CPC ......... Y10T 137/7368; Y10T 137/7371; Y10T 137/7378; Y10T 137/7374;
(Continued)

(56) References Cited

U.S. PATENT DOCUMENTS

| | | |
|---|---|---|
| 3,008,482 A | 11/1961 | Hunter |
| 4,305,422 A | 12/1981 | Bannink |

(Continued)

*Primary Examiner* — Reinaldo Sanchez-Medina
*Assistant Examiner* — Hailey K Do
(74) *Attorney, Agent, or Firm* — Levenfeld Pearlstein, LLC

(57) ABSTRACT

The present invention relates broadly and separately to a flow control valve and a float control valve assembly for use in the refilling of storage vessels, particularly fuel tanks. The invention also relates generally to a vessel overfill protection system. The flow control valve comprises a valve body defining a fluid passageway disposed between a fluid inlet and a fluid outlet and a piston assembly located at least in part within the fluid passageway. The piston assembly includes a piston support to which a piston is slidably mounted for opening and closure of the fluid outlet. The piston support includes at least one fluid sampling passage arranged to provide pressurised fluid from the fluid inlet to an upstream surface of the piston which is urged for opening of the fluid outlet to permit flow of fluid through the fluid passageway. The float control valve assembly includes a float assembly body adapted to mount within a vessel to be filled with fluid via the flow control valve. The float control valve includes a pilot valve and a pilot control passage in fluid communication with the flow control valve. The pilot valve is operatively coupled to a float member for closure of the pilot control passage on flooding of the float housing to promote closure of the flow control valve.

17 Claims, 25 Drawing Sheets

(51) Int. Cl.
*B67D 7/36* (2010.01)
*B67D 7/46* (2010.01)
*F16K 31/34* (2006.01)
*F17C 5/02* (2006.01)
*F16K 21/18* (2006.01)
*F16K 24/04* (2006.01)
*F16L 37/34* (2006.01)
*F16K 27/07* (2006.01)

(52) U.S. Cl.
CPC ............ *F16K 24/042* (2013.01); *F16K 27/07* (2013.01); *F16K 31/34* (2013.01); *F16L 37/34* (2013.01); *B60K 2015/03256* (2013.01); *B60K 2015/03289* (2013.01); *B60K 2015/03368* (2013.01); *B67D 7/46* (2013.01); *F17C 5/02* (2013.01); *F17C 2260/022* (2013.01); *Y10T 137/3077* (2015.04); *Y10T 137/3099* (2015.04); *Y10T 137/7371* (2015.04)

(58) Field of Classification Search
CPC ......... Y10T 137/7293; Y10T 137/7423; Y10T 137/3099; Y10T 137/3077; F16K 21/18; F16K 21/20; F16K 24/042; F16K 24/044; F16K 31/26; F16K 31/34; F16K 31/1221; F16K 31/1223; F16K 31/124; F16L 29/02; F16L 29/04; F16L 37/34; F17C 2260/022; B65D 90/26; B67D 7/367; B67D 7/365; B67D 7/46; B60K 2015/03368

See application file for complete search history.

(56) References Cited

U.S. PATENT DOCUMENTS

| | | | |
|---|---|---|---|
| 6,311,723 B1 | 11/2001 | Shipp et al. | |
| 7,467,649 B2 * | 12/2008 | Luntz | B60K 15/04 141/302 |
| 8,281,823 B2 | 10/2012 | Mitrovich et al. | |
| 9,772,043 B2 * | 9/2017 | Ballard | F16L 37/34 |
| 2007/0163672 A1 * | 7/2007 | Luntz | B60K 15/04 141/350 |
| 2011/0079320 A1 | 4/2011 | Mitrovich et al. | |
| 2014/0261884 A1 | 9/2014 | Quang | |
| 2015/0165897 A1 * | 6/2015 | Ballard | F16L 37/34 137/202 |
| 2017/0114914 A1 * | 4/2017 | Esveldt | F16K 31/1223 |

* cited by examiner

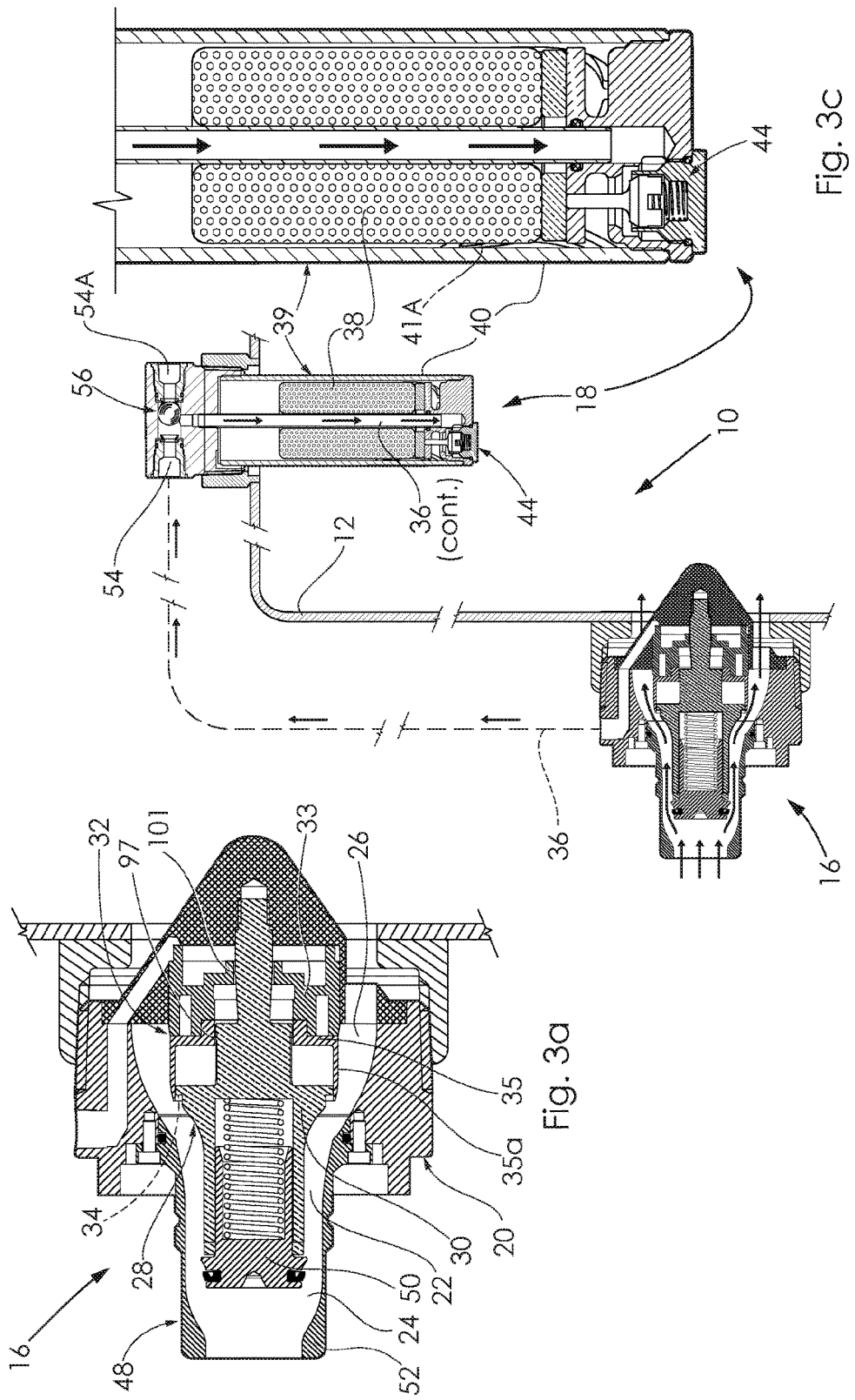

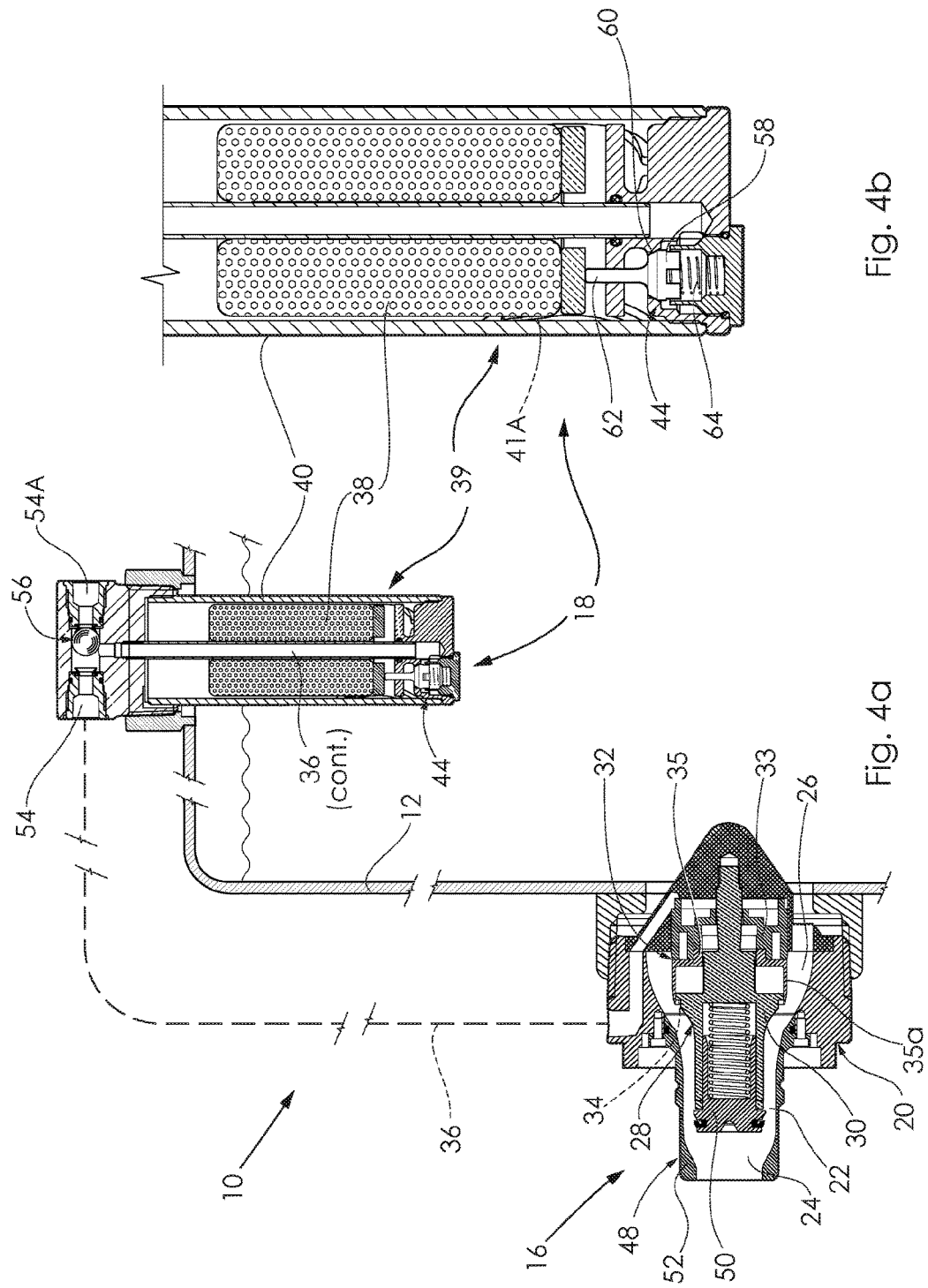

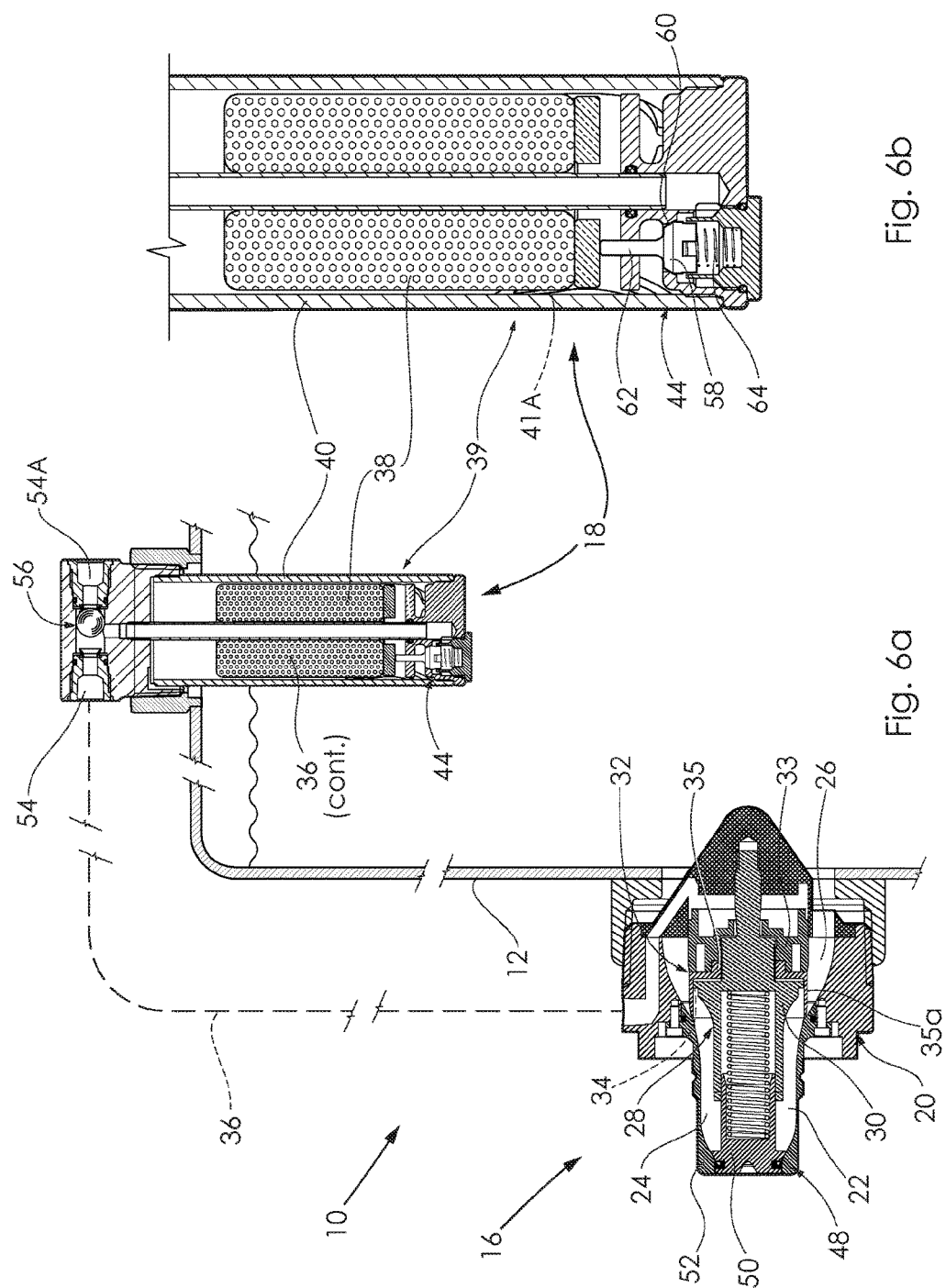

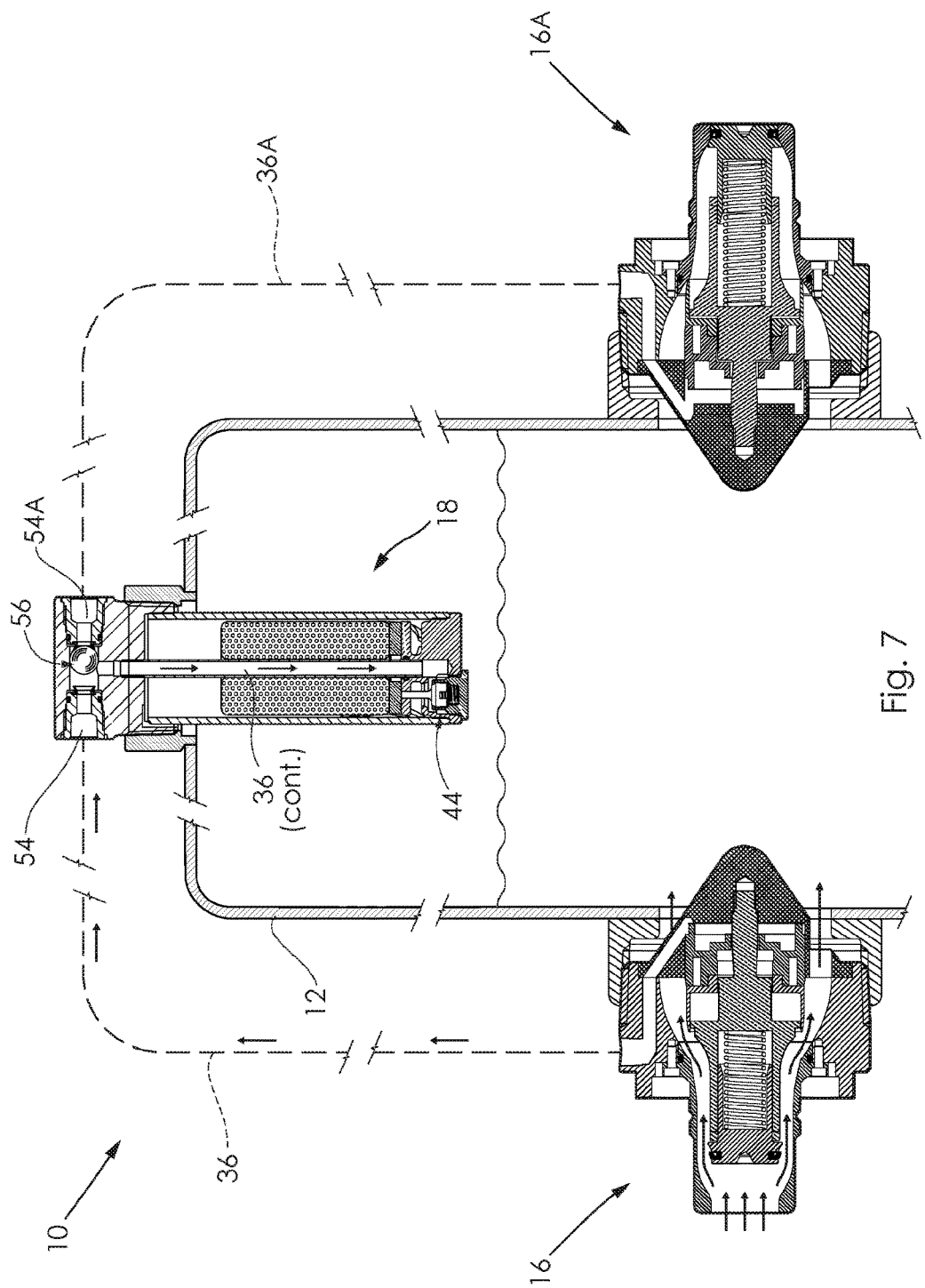

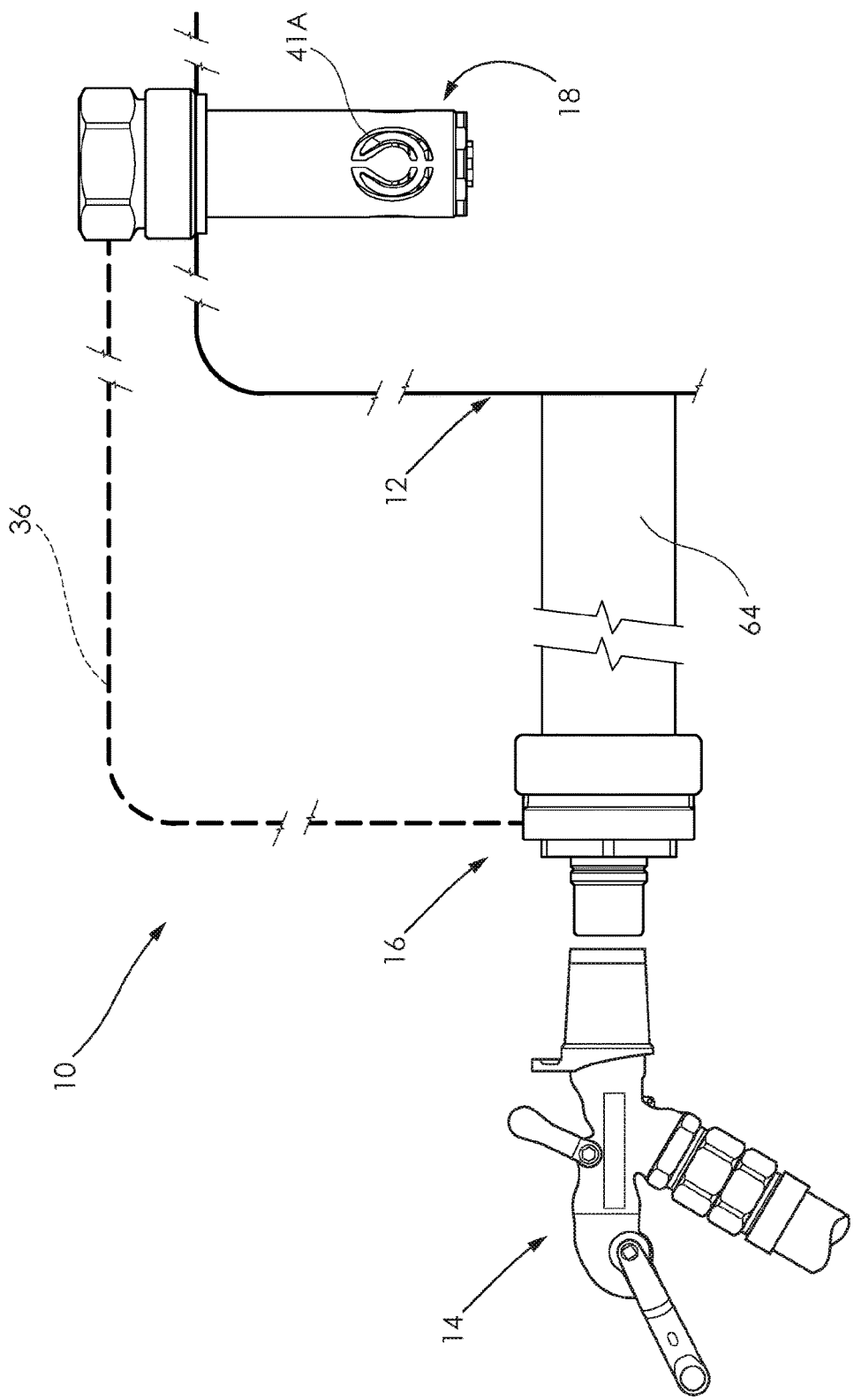

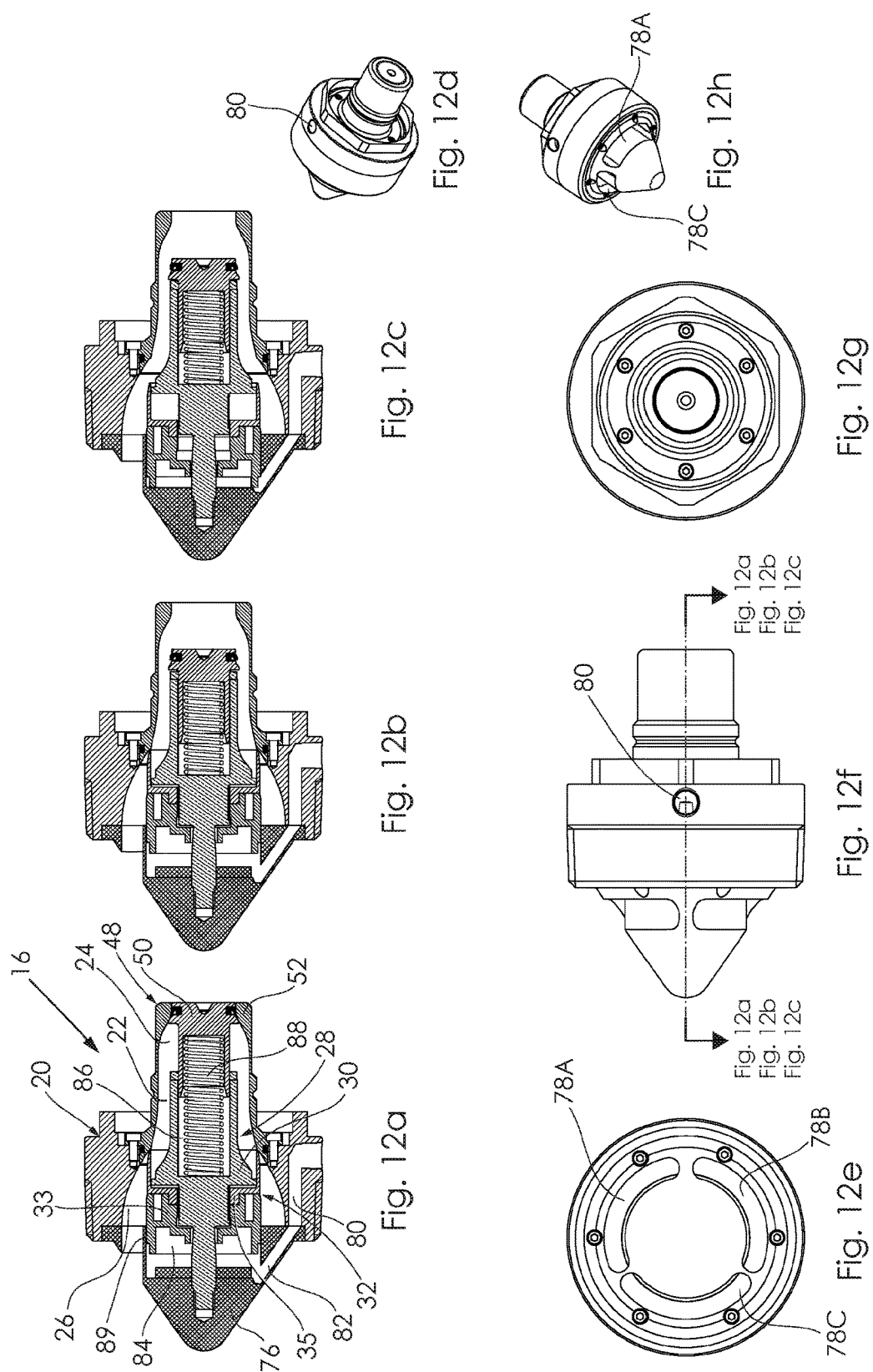

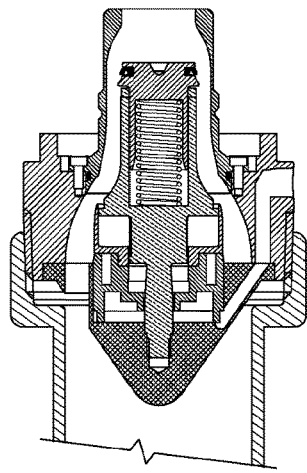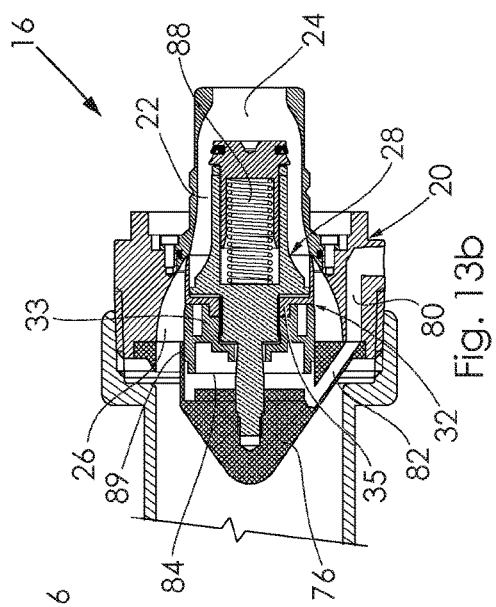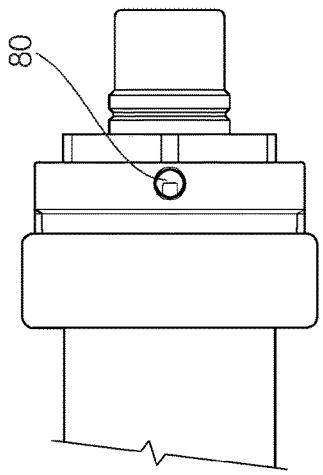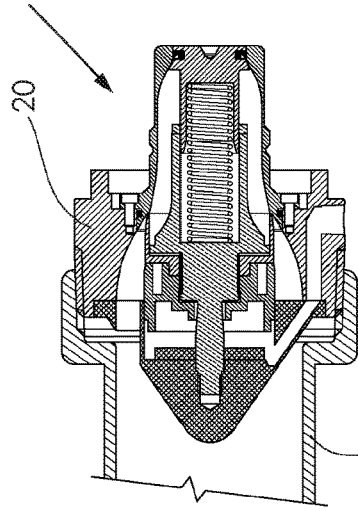

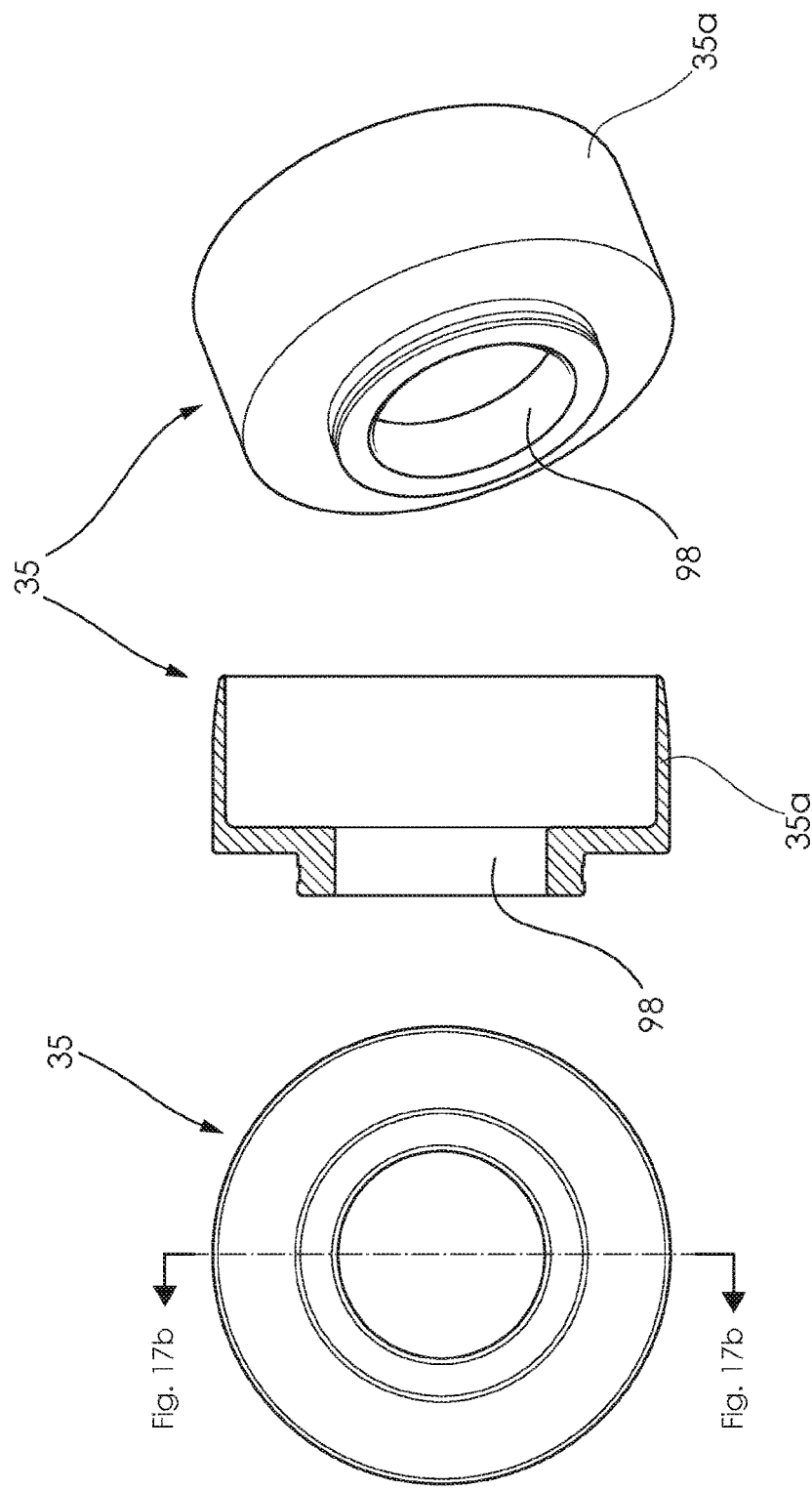

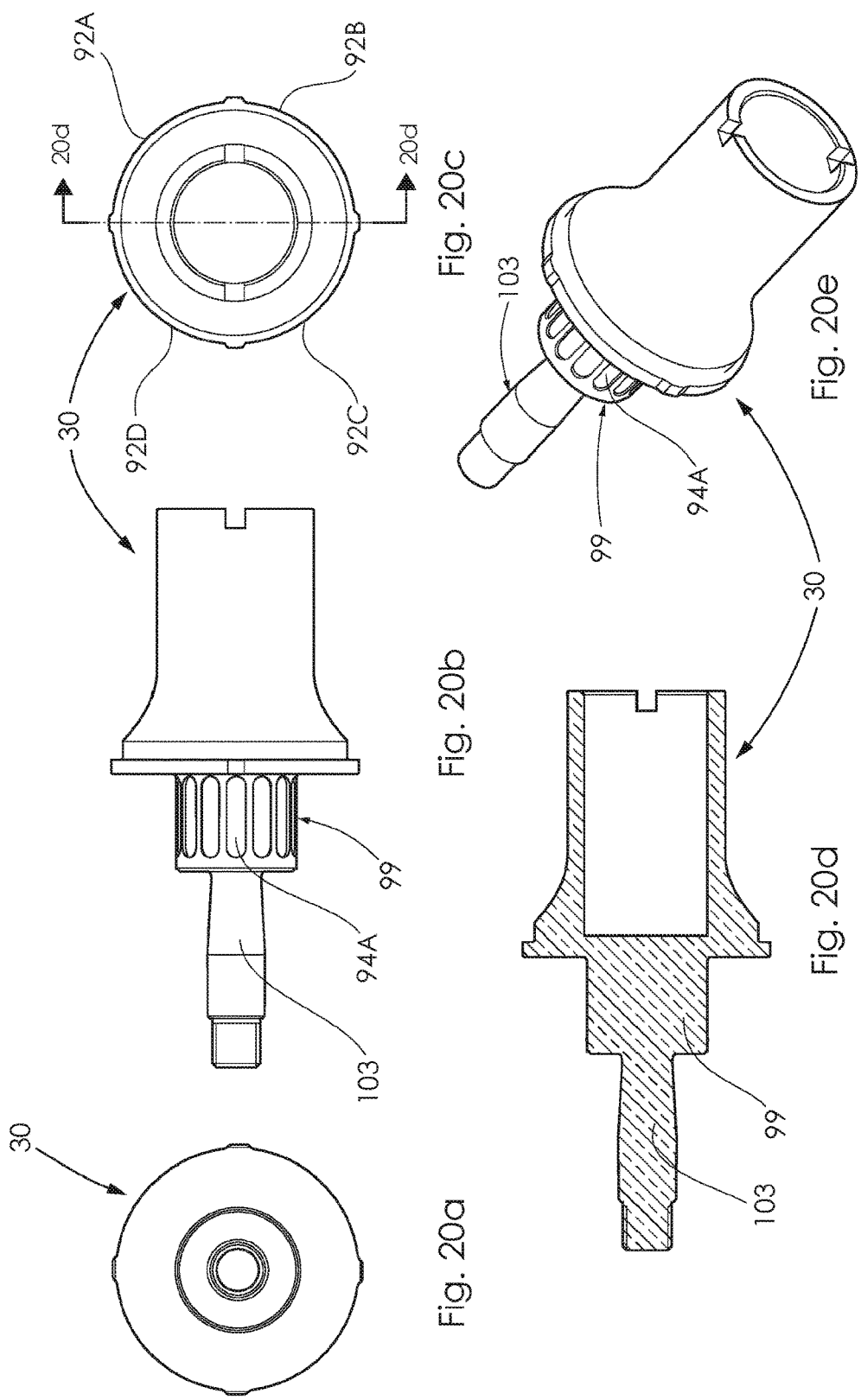

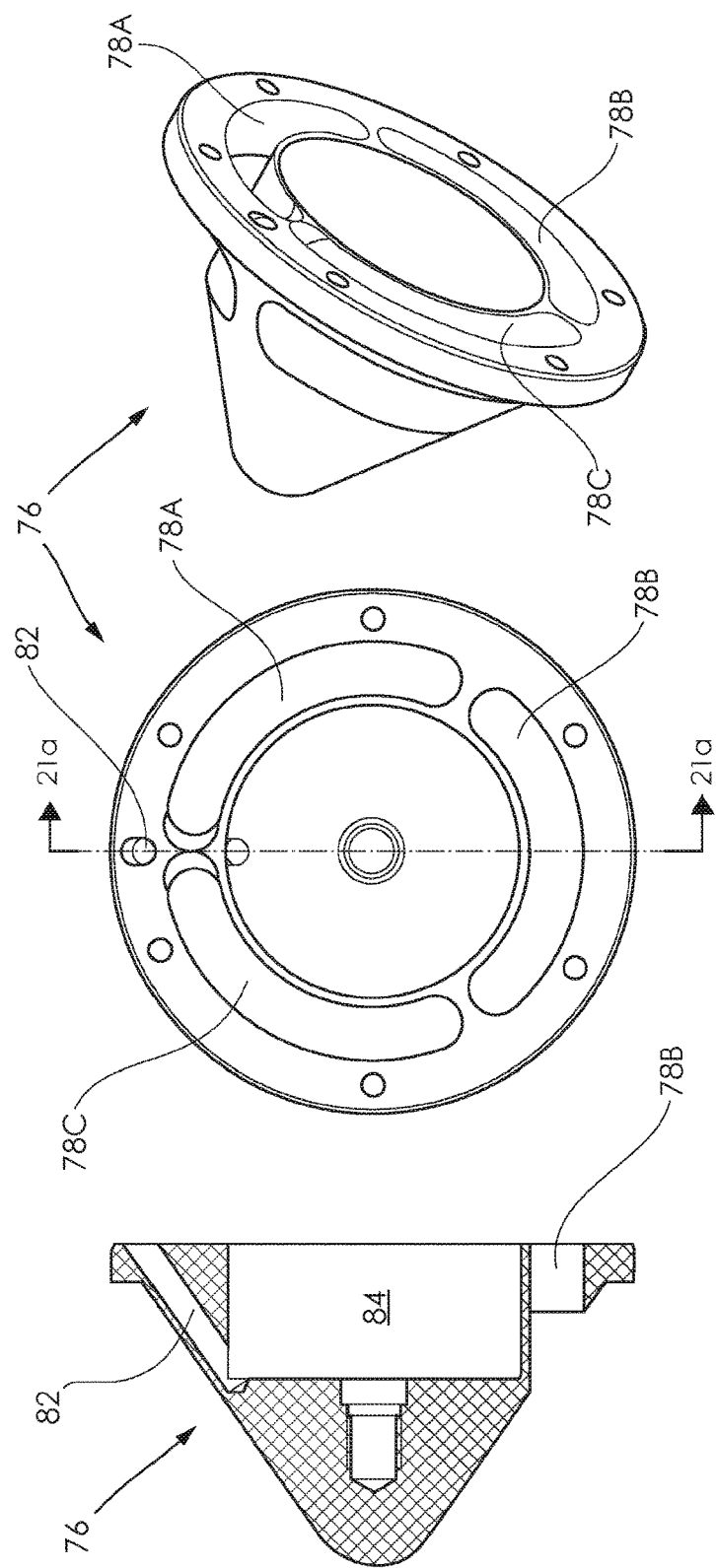

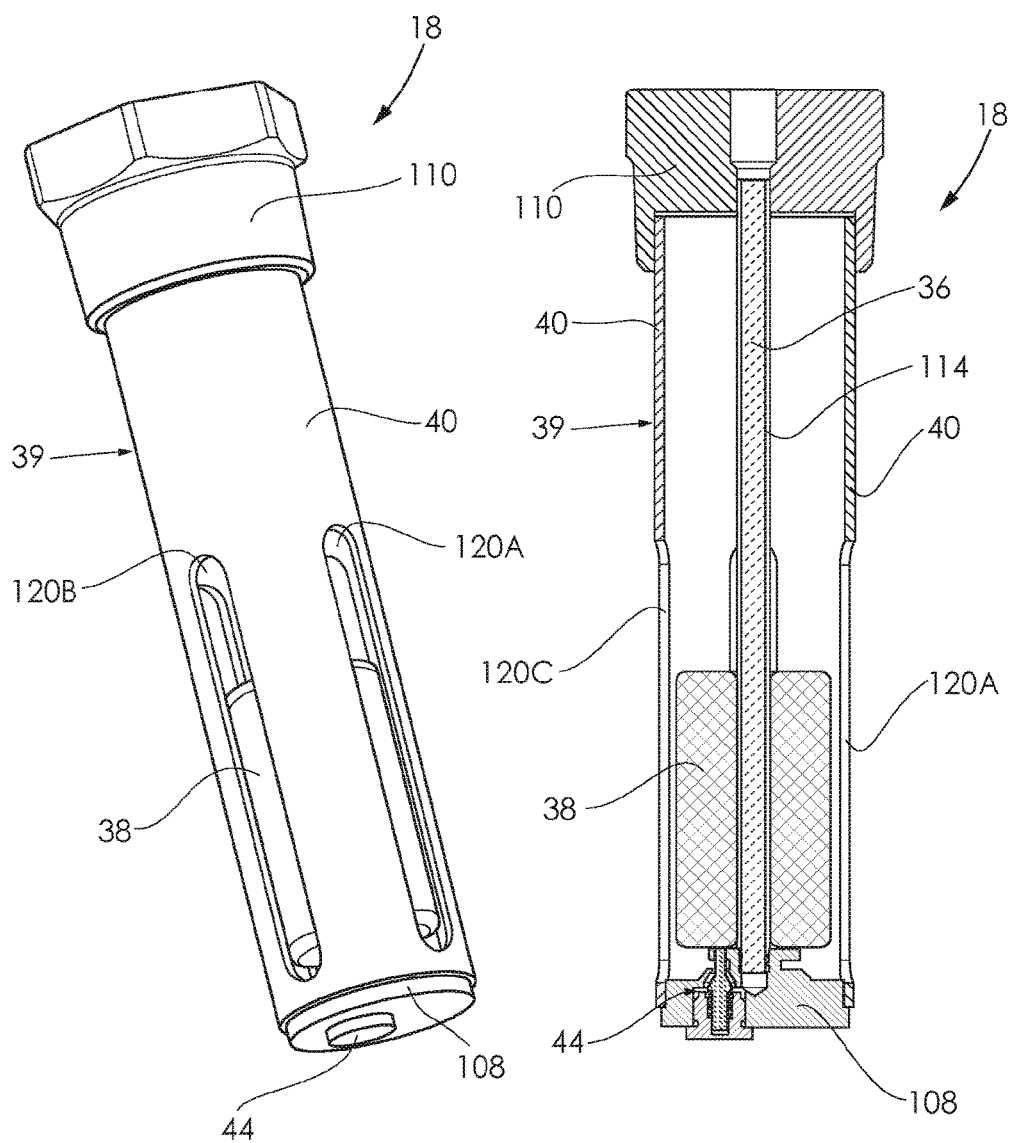

VESSEL OVERFILL PROTECTION SYSTEM

This is a National Stage Application of International Patent Application No. PCT/AU2015/050802, filed Dec. 17, 2015, which claims the benefit of and priority to Australian (AU) Patent Application No. 2014905114, filed Dec. 17, 2014, the entirety of which are incorporated fully herein by reference.

TECHNICAL FIELD

The present invention relates broadly and separately to a flow control valve and a float control valve assembly. The invention also relates generally to a vessel overfill protection system.

BACKGROUND OF INVENTION

Typically the refilling of storage vessels, particularly fuel tanks, involves the use of refuelling nozzles having automatic shut-off. The fuel tank is vented but designed so that pressure inside the tank increases as the tank is close to full. The refilling nozzle includes a pressure-sensitive mechanism which provides for automatic shut-off as the tank approaches its full level. The automatic shut-off nozzle is triggered by the pressure sensitive mechanism for closure at a preset pressure as the tank is close to full.

More recently it has been desirable to not pressurise the tank or vessel to be filled. In these applications such as refilling engine fuel tanks, there is still a requirement to prevent overfilling of the tank. This is achieved by automatic closure of a flow control valve associated with the tank and to which fluid couplings are connected to facilitate the refilling process. The flow control valve is designed to be closed when the tank is full as detected by a fluid level sensor. In a hydraulically controlled system, the fluid level sensor typically includes a float valve which closes when the tank is full. This closure of the float valve restricts or stops the flow of fluid bled from the flow control valve to effect its automatic closure. The patent literature is replete with refuelling systems of this nature such as U.S. Pat. No. 6,311,723 by Shipp & Turner.

The fluid level sensor such as that disclosed in U.S. Pat. No. 6,311,723 may include a float connected to the float valve via a float arm in a similar manner to a conventional toilet cistern or other cantilever style float valves. In more sophisticated systems, the float valve includes a cylindrical-shaped housing which contains a float which controls the actuation of an inlet valve to in turn hydraulically activate the flow control valve for closure when the tank has reached its nominated "full" capacity and prior to overfilling of the tank. The valve assembly disclosed in international patent application no. PCT/AU2003/001436 by Smit is an example of a float valve of this construction.

U.S. Pat. No. 4,305,422 by Bannink discloses a filler valve for a fuel tank, comprising a valve body to be mounted in the wall of the tank. The upper end of the valve body is where a filler hose can be connected. The wall of the valve body includes outlet ports and two shut-off valves are provided in the valve body. A passage is present between the shut off valves and the space between the two valves is in open communication with the space under the valve members. The space under the valve members includes a passage opening that is controlled by a float. When the tank approaches full, the float will shut an opening such that the pressure of liquid in the space under the second shut off valve and in the space between the two valves will become equal to the pump or filling pressure and as a result the valves will close.

U.S. Pat. No. 8,281,823 by Mitrovich discloses a refueling apparatus having a combination float control module and a fluid flow control valve for use in high pressure, high flow rate refueling systems. The fluid flow control valve includes a piston that includes a convex shaped head with beveled edges that is operable to open in response to the initiation of flow from a filler nozzle through the valve. The piston has a centrally located bleed passageway that provides fluid communication between opposite sides of the piston to thereby allow fluid to bleed via a bleed passage to the float control module. When the float control module detects the tank is full it shuts off the bleed passage to thereby change the relative pressures of liquid on opposite sides of the piston to thereby close the piston and shut off the flow of fluid.

In refilling storage vessels it is generally advantageous to provide maximum fluid flow to minimise the associated fill time. Existing fluid flow control valves are characterised by turbulence in the flow of the fluid through the valve assembly resulting in reduced flow rates and undesirable back pressure. Also, existing automatic shut-off nozzles have a tendency to prematurely shut-off at relatively high flowrates before the vessel has reached its "full" design capacity due to back pressure resulting from obstructions ("chokes") to the flow of fluid through the flow control valve. In order to ensure complete filling of the vessel, operators may manually (or otherwise forcibly) override the automatic (pressure sensitive) shut-off mechanism of the nozzle increasing the risk of overfilling the vessel and causing fuel spillage with its associated hazards.

SUMMARY OF INVENTION

According to a first aspect of the invention there is provided a flow control valve comprising:
  a valve body defining a fluid passageway disposed between a fluid inlet and a fluid outlet;
  a piston assembly located at least in part within the fluid passageway, the piston assembly including a piston support to which a piston sub-assembly is slidably mounted for opening and closure of the fluid outlet, the piston support including at least one fluid sampling passage arranged to provide pressurised fluid from the fluid inlet to an upstream surface of the piston sub-assembly, said upstream surface being urged by the pressurised fluid to provide opening of the fluid outlet to permit flow of fluid through the fluid passageway;
  a bleed passage including at least one annular space between the piston sub-assembly and the piston support, said bleed passage disposed between the piston sub-assembly and the piston support downstream of the fluid sampling passage;
  a pilot fluid passage at least in part located within the valve body, said pilot passage at one end in fluid communication with bleed fluid associated with the bleed passage and located proximal a downstream surface of the piston sub-assembly and at an opposite end in fluid communication with a float control assembly Preferably said at least one fluid sampling passage includes a plurality of sampling passages formed about a periphery of the piston support. More preferably the sampling passages are at least in part defined by respective channels formed in the periphery of the piston support. Even more preferably the sampling passages are each defined by the respective channels together with an inner circumferential surface of the piston.

Preferably the piston assembly includes a piston sub-assembly including the piston slidably mounted to the piston support.

Preferably or alternatively the bleed passage includes one or more slots or grooves formed in the piston support.

Preferably the piston sub-assembly includes a greater projected surface area on its downstream side relative to its projected surface area on the upstream side thereby providing the force imbalance for closure of the piston subassembly.

Preferably the flow control valve operates without biasing means assisting closure of the fluid outlet via the piston sub-assembly.

Preferably, when closing the fluid outlet the piston sub-assembly presents a surface within the fluid passageway that extends in a substantially axial direction within the valve body. Such an embodiment is advantageous as when closing the fluid outlet the piston does not present surface transverse to the axis of the valve body that can be mechanically engaged and displaced, such as by insertion of a rod or rigid wire through the fluid inlet, thus preventing manual opening of the fluid outlet and thus allowing the piston assembly effectively tamper-proof.

Preferably the fluid outlet is at least in part defined by an annular space between the piston support and the valve body, the piston arranged for opening and closure of the annular space. More preferably the fluid outlet is also partly defined by axially oriented passages formed in the valve body downstream of the annular space.

Preferably the flow control valve further comprises a fluid receiver assembly mounted to the valve body proximal the fluid inlet. More preferably the fluid receiver assembly includes a fluid receiver body within which a normally-closed poppet valve is slidably mounted to the piston support and adapted to be axially displaced and opened by a fluid filling nozzle. .

According to a second aspect of the invention there is provided a float control valve assembly comprising:
  a float assembly body adapted to mount within a vessel to be filled with fluid via a flow control valve, said float body including a float housing having one or more fluid openings in its perimeter wall;
  a pilot valve including an actuation member and operatively coupled to the float assembly body;
  a float member separate from the actuation member and located within the float housing to float on flooding of the float housing with fluid from the vessel via the fluid openings;
  a pilot control passage at opposite ends in fluid communication with the flow control valve and the pilot valve respectively, the pilot valve arranged to cooperate with the float member for closure of the pilot control passage on flooding of the float housing whereby the float member is released from the actuation member to promote closure of the flow control valve.

Preferably the float housing is shaped substantially cylindrical and the float assembly body includes closure members at its respective ends, the pilot valve mounted to a lowermost of the closure members. More preferably an uppermost of the closure members includes at least two fluid pilot ports for coupling the pilot control passage to respective and separate flow control valves. Even more preferably the uppermost of the closure members includes a shuttle valve which provides opening of one of the two pilot ports and closure of the other port, or vice versa, for operation of a respective one of the flow control valves. Alternatively the shuttle valve or equivalent is mounted external to the float assembly body.

Alternatively the pilot valve is mounted to the uppermost of the closure members.

Preferably the pilot valve includes a poppet valve arranged to seat with a valve seat formed in the pilot control passage for its closure. More preferably the poppet valve includes the actuation member arranged to contact the float member for displacement of the poppet valve to unseat it from the valve seat for opening of the pilot valve. Even more preferably the pilot valve includes biasing means arranged to urge the poppet valve into seated engagement with the valve seat for closure of the pilot valve on flooding of the float housing wherein the float member floats out of contact with the actuation member.

In the alternative arrangement with the pilot valve connected to the uppermost of the closure members contact of the float member with the actuation member on flooding of the float housing effects closure of the pilot valve.

Preferably the float member is a tubular float slidably mounted about an axial pilot member which at least in part defines the pilot control passage. More preferably the axial pilot member is connected at its respective ends to the uppermost and the lowermost closure members.

Preferably the float assembly body includes a breather passage arranged to vent and admit air from and to the float housing on floating and lowering of the float member respectively. More preferably the breather passage is located between the float housing and the uppermost closure member.

According to a third aspect of the invention there is provided a vessel overfill protection system comprising:
a) a flow control valve adapted to operatively couple to a vessel to be filled with fluid, said flow control valve including:
  a valve body defining a fluid passageway disposed between a fluid inlet and a fluid outlet operatively coupled to the vessel;
  a piston assembly located at least in part within the fluid passageway, the piston assembly including a piston support to which a piston sub-assembly is slidably mounted for opening and closure of the fluid outlet, the piston support including at least one fluid sampling passage arranged to provide pressurised fluid from the fluid inlet to an upstream surface of the piston sub-assembly, said upstream surface being urged by the pressurised fluid to provide opening of the fluid outlet to permit flow of fluid through the fluid passageway into the vessel;
  a bleed passage including at least one annular space between the piston sub-assembly and the piston support, said bleed passage disposed between the piston sub-assembly and the piston support downstream of the fluid sampling passage;
b) a float control valve assembly adapted to mount to the vessel and being operatively coupled to the flow control valve via a pilot fluid passage to control opening and closure of the flow control valve:
c) the pilot fluid passage at least in part located within the valve body, said pilot passage at one end in fluid communication with bleed fluid associated with the bleed passage and located proximal a downstream surface of the piston sub-assembly and at an opposite end in fluid communication with the float control valve
  Preferably the float control valve assembly includes:

a float assembly body including a float housing having at least one fluid opening in its perimeter wall;

a float member slidably located within the float housing and arranged to float on flooding of the float housing with fluid from the vessel via the fluid openings;

a pilot valve operatively coupled to the float assembly body;

the pilot valve arranged to cooperate with the float member for closure of the pilot fluid passage on flooding of the float housing to promote closure of the flow control valve via the piston sub-assembly.

Preferably said at least one fluid opening in the perimeter wall of the float housing is either a single fluid opening or a series of fluid openings at substantially the same level.

BRIEF DESCRIPTION OF THE FIGURES

In order to achieve a better understanding of the nature of the present invention a preferred embodiment of a vessel overfill protection system together with its associated flow control valve and float control valve assembly will now be described, by way of example only, with reference to the accompanying drawings in which:

FIG. 3a is a sectional view of the fluid flow control valve of FIG. 1a wherein the valve is opened;

FIG. 3b is a sectional view of the system of FIG. 2 with the flow control valve opened;

FIG. 3c is a sectional view of the float control valve of FIG. 1b;

FIGS. 4a, 4b, 5a, 5b, 6a and 6b are sectional views of the system of the preceding figures showing the sequence of events in closure of the flow control valve as activated by the float control valve assembly;

FIG. 7 is a sectional view of a second embodiment of a vessel overfill protection system in this case including two flow control valves associated with a common float control valve assembly according to the invention;

FIG. 8 is a schematic view of a third embodiment of a vessel overfill protection system with the flow control valve remote from the associated vessel;

FIGS. 12a to 12h show various views of the flow control valve according to another aspect of the invention taken from any one of the first to the fourth preceding embodiments having the integral fluid receiver assembly;

FIGS. 13a to 13d and 14a to 14d show various views of alternative installations of the flow control valve of the embodiment of FIG. 12;

FIGS. 17a to 17c show various views of a piston of the piston sub-assembly taken from the flow control valve of FIG. 12;

FIGS. 20a to 20e shows various views of the piston support taken from the flow control valve of FIG. 12;

FIGS. 21a to 21c show various views of the piston housing taken from the flow control valve of FIG. 12;

FIGS. 24 and 25 are perspective and sectional views respectively of an alternative float control valve assembly according to this aspect of the invention.

DETAILED DESCRIPTION

Figure 1:
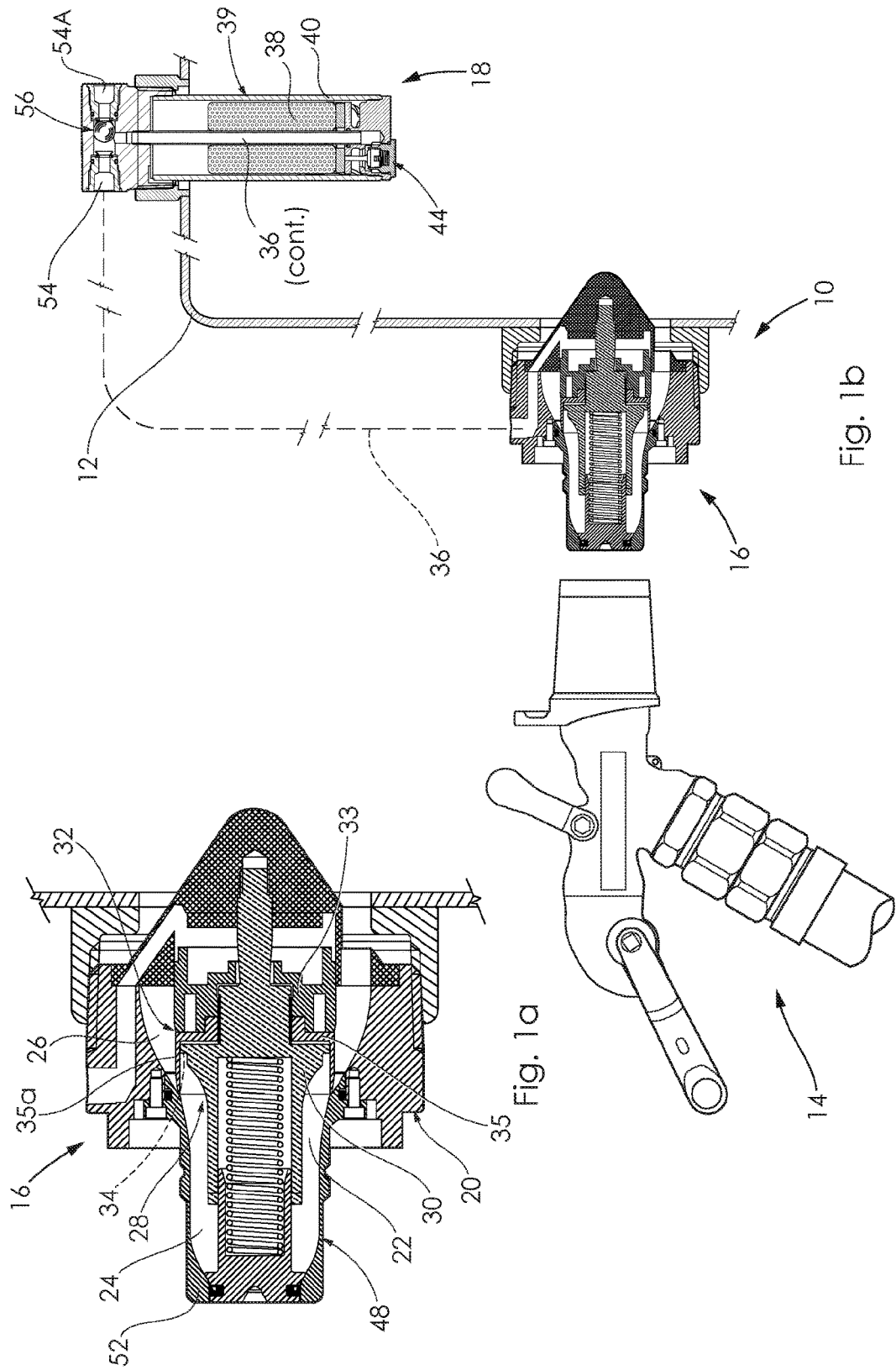
FIG. 1a is a sectional view of an embodiment of a flow control valve according to the present invention.
FIG. 1b is a part sectional view of an embodiment of a vessel overfill protection system according to the present invention including the fluid flow control valve of Figure 1a and a float control valve.

As shown in FIGS. 1a and 1b there is a vessel overfill protection system designated generally at 10 associated with a fluid vessel 12 to be filled with a fluid via a fluid nozzle or in this case a refuelling nozzle 14. The system 10 comprises a flow control valve 16 operatively coupled to a float control valve assembly 18. The flow control valve 16 and the float control valve assembly 18 of this embodiment are both adapted to mount to the vessel 12. The float control valve assembly 18 controls opening and closure of the flow control valve 16 to minimise the risk of overfilling the vessel 12.

The flow control valve 16 includes a valve body 20 which defines a fluid passageway 22 disposed between a fluid inlet 24 and a fluid outlet 26. The flow control valve 16 also includes a piston assembly 28 located partly within the fluid passageway 22. The piston assembly 28 includes a piston support 30 to which a piston sub-assembly 32 is slidably mounted for opening and closure of the fluid outlet 26. The piston sub-assembly 32 includes a piston mount 33 secured coaxial with a piston 35. Importantly the piston support 30 includes one or more fluid sampling passages 34, illustrated in more detail in FIGS. 15 and 16, that are arranged to provide pressurised fluid from the fluid inlet 24 to an upstream surface of the piston 35. The pressurised fluid is also provided to an upstream surface of the piston mount 33. The fluid pressure on the projected upstream surfaces of the piston sub-assembly 32 is higher than the fluid pressure on the downstream side of the piston sub-assembly 32. This pressure imbalance urges the piston sub-assembly 32 open to expose the fluid outlet 26. This permits flow of fluid through the fluid passageway 22 exiting the fluid outlet 26.

The float control valve assembly 18 is operatively coupled to the flow control valve 16 via a fluid pilot passage represented at least in part by broken line detail at 36. In this embodiment the float control valve assembly 18 includes a float member 38 located within a float housing 40 of a float assembly body 39 and arranged to float on filling of the vessel 12. The float housing 40 is flooded via a fluid opening such as 41A, illustrated in more detail in FIG. 22c, which on filling of the vessel 12 permits the entry of fluid from the vessel 12. The float control valve assembly 18 also includes a pilot valve 44 operatively coupled to the float assembly body 39 and arranged to cooperate with the float member 38 for closure of the pilot passage 36 on flooding of the float housing 40. The pilot valve 44 is connected to the fluid pilot passage 36 so that its closure promotes closure of the flow control valve 16. Thus, on filling of the vessel 12 the flow control valve 16 is automatically closed via the float control valve assembly 18.

Figure 2:
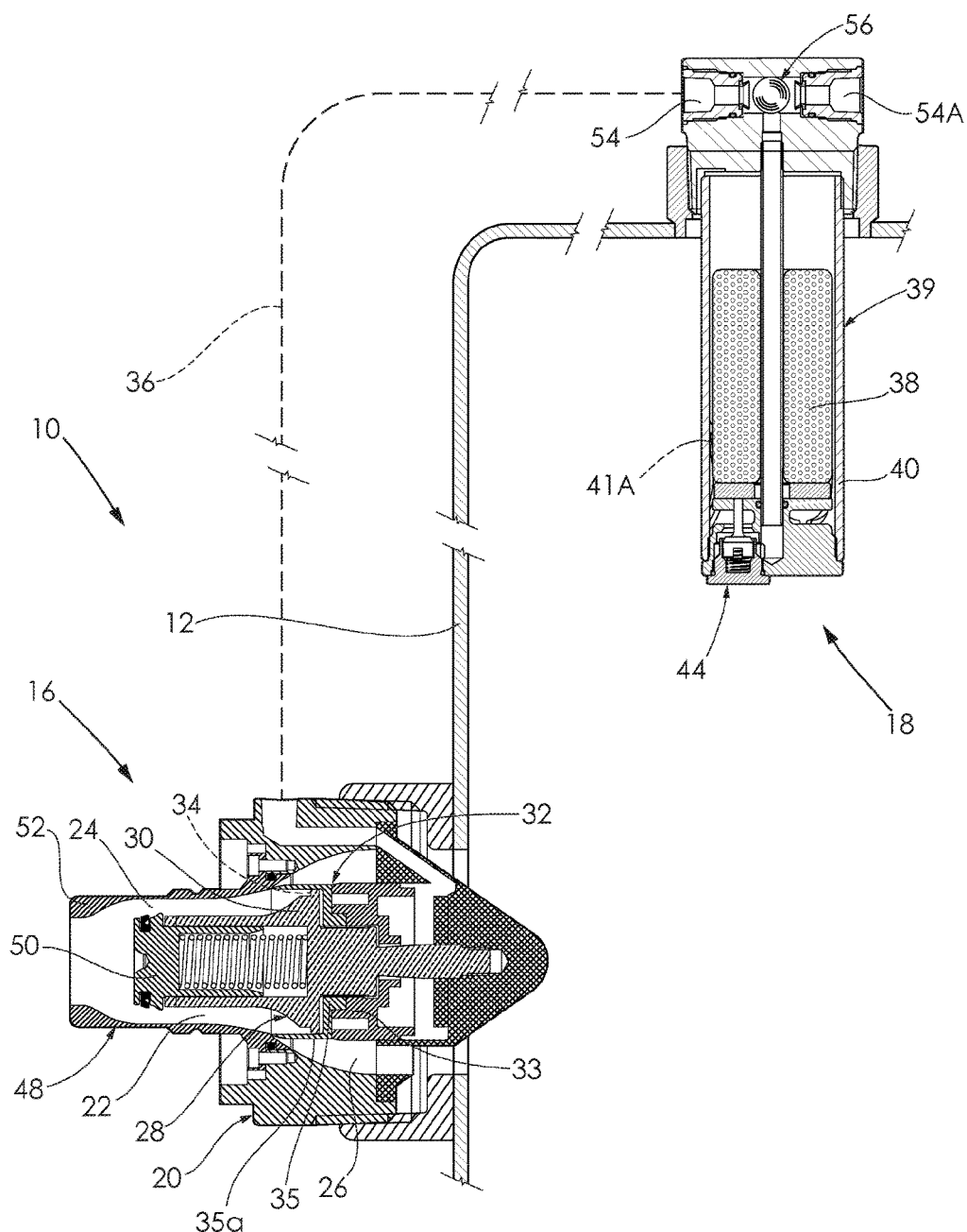
FIG. 2 is a sectional view of the system of FIG. 1 showing the poppet valve associated with the fluid receiver assembly opened.
Figures 5A, 5B:
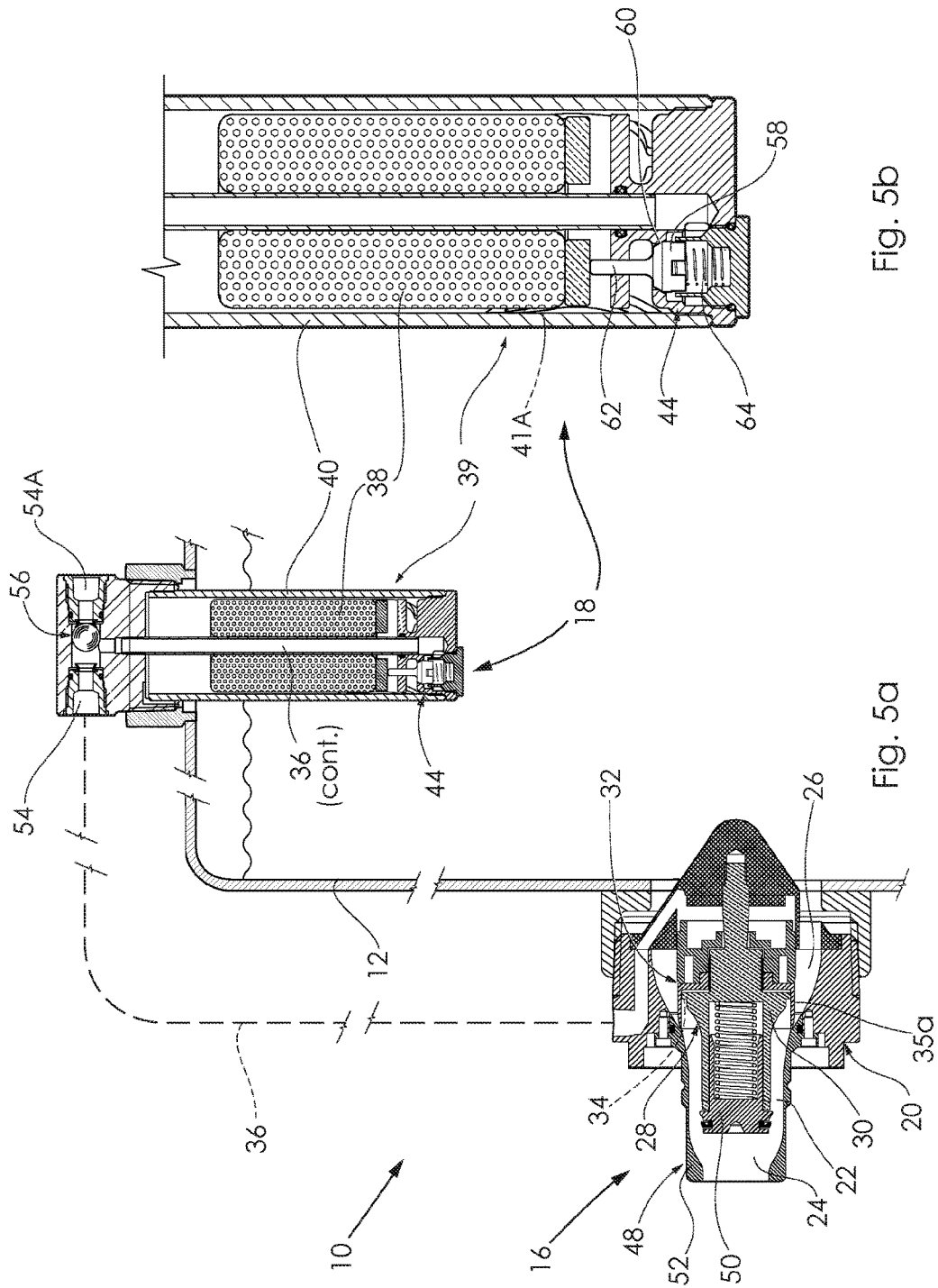

FIG. 2 is a sectional view of the system 10 of FIG. 1 showing a fluid receiver assembly 48 associated with the flow control valve 16 opened by a refuelling nozzle, such as the refuelling nozzle 14 of FIG. 1b, latched to the receiver body 52. The refuelling nozzle 14 is typically of a pressure-sensitive design engineered to automatically close in response to fluid pressure inside the receiver body 52. The fluid receiver assembly 48 includes a poppet valve 50 that, as illustrated in FIG. 2, has been displaced by contact with the latched refuelling nozzle 14.

The receiver assembly 48 may change in design depending on the type and configuration of the refuelling nozzle 14 used. The refuelling nozzle need not provide automatic shut-off and may be of a manual shut-off design. The receiver assembly 48 may also be designed to permit automatic identification including an electronic identification button located in a mating end of the receiver for electrical or "wired" contact with the latched refuelling nozzle 14. This type of automatic identification is disclosed in Australian patent no. 737046 which has been assigned to the applicant. The disclosure of this patent is to be considered included herein by reference.

Referring to FIG. 2, the piston sub-assembly 32, with the refuelling nozzle 14 connected, initially maintains closure of the fluid outlet 26. As illustrated in FIGS. 3a and 3b, pressurised fluid from the fluid inlet 24, which is provided from the refuelling nozzle 14, is provided at the projected upstream surfaces of the piston sub-assembly 32 via the fluid sampling passages 34. The pressurised fluid urges the piston sub-assembly 32 to axially slide along the piston support 30 for opening of the fluid outlet 26. The flow control valve 16 is configured so as to reduce the resistance to fluid flow through the valve assembly to thereby decrease the incidence of premature closure of the refuelling nozzle 14, specifically those that are of "pressure sensitive" design. In particular, the control valve 16 includes:

i) the piston support 30 having an outer surface at an upstream portion being generally cylindrically-shaped and extending downstream into a frusto-conical shape (i.e. flared outwardly), which together define, at least in part, a wall of the fluid passageway 22 and which promotes a substantially laminar, or laminar-like, flow, with minimal turbulence, through reduced obstruction to the flow of fluid through the fluid passageway 22;

ii) the piston 35 which is substantially cup-shaped with an outside perimeter wall 35a which defines, at least in part, a wall of the fluid passageway 22 is generally aligned with a direction of fluid flow through the passageway 22 wherein the piston 35 effectively cuts or slices through the fluid on closure of the piston sub-assembly 32;

iii) the fluid passageway 22 which together with the fluid inlet 24 and the fluid outlet 26 are optimally designed to reduce the resistance to fluid flow within the flow control valve assembly 16.

The flow control valve 16 of this embodiment is thus designed to handle relatively high-flowrates, for example greater than 1000 LPM, without generating back-pressures likely to cause premature closure of the automatic refuelling nozzle 14. The cup-shaped piston 35 is wedge-like at its leading edge. The perimeter wall 35a of the piston 35 may be shaped generally cylindrically or tapered outward in a downstream direction so that it is slightly conical (i.e. outwardly flared) and designed to define, at least in part, the wall of the fluid passageway 22 and to also promote a substantially laminar, or laminar-like flow, with minimal turbulence, through reduced obstruction to the flow of fluid through the fluid passageway 22 and control valve 16. The configuration of the piston sub-assembly 32 and the piston 35 thereof is that when open to expose the fluid outlet 26 it is substantially out of the flow path of fluid through the fluid passageway 22. The piston sub-assembly 32 and the piston 35 thereof contrast with existing flow control valves such as in U.S. Pat. No. 8,281,823 by Mitrovich which include a flow control valve having a piston which presents a surface transverse to the direction of fluid flow through the valve that deflects a substantial proportion of the fluid thus causing substantial turbulence in the flow and associated fluid energy loss (back pressure).

The piston assembly 28 is also designed so that it is effectively tamper-proof. That is, the piston sub-assembly 32 is "protected" by the fluid receiver assembly 48 and mounted relative to the valve body 20 and the piston support 30 to prevent tampering in the form of mechanical displacement of the piston sub-assembly 32 for opening of the valve 16. This tamper-proof design is intended to reduce the likelihood of theft of the vessel fluid.

The float control valve assembly 18 may include two fluid pilot ports 54 and 54A coupled to respective flow control valves 16 and 16A via respective fluid pilot passages 36 and 36A, as illustrated in FIG. 7 for example. The float control valve assembly 18 also includes a shuttle valve 56 which provides for opening of one of the two pilot ports such as 54 and closure of the other port 54A.

FIGS. 3a, 3b and 3c show the system 10 of the embodiment of FIG. 2 where:
1. The pressurised fluid has effected displacement of the piston sub-assembly 32 and opening of the fluid outlet 26 with the pressurised fluid provided at the projected upstream surfaces of the piston sub-assembly 32 via the fluid sampling passages 34, which are illustrated in more detail in FIGS. 15 and 16;
2. The pressurised fluid is bled from the upstream surfaces of the piston sub-assembly 32 via bleed passages, discussed in more detail below with reference to FIGS. 15 and 16, to a downstream side of the piston sub-assembly 32 for the provision of the bleed fluid to the fluid pilot passage 36 for opening of the fluid pilot port 54.

Whilst the vessel 12 is being filled via the refuelling nozzle 14 the pilot valve 44 of the float control valve assembly 18 is urged open on contact with the float member 38. This means the bleed fluid is vented via the fluid pilot passage 36 to within the float housing 40 and into the surrounding vessel 12 vapour space. The piston sub-assembly 32 is displaced axially to open the fluid outlet 26 due to a fluid pressure imbalance across the upstream and downstream sides or faces of the piston sub-assembly 32. The free "venting" or passage of pressurised fluid via the bleed passage to the pilot valve 44 within the float control valve assembly 18 and subsequently to the vessel 12 interior creates the fluid pressure imbalance.

FIGS. 4a, 4b, 4c, 5a, 5b, 6a and 6b sequentially illustrate operation of the vessel overfill protection system 10 when the vessel 12 is filled. Each of these illustrations include an enlarged view of the float control valve assembly 18 to more clearly depict operation of the pilot valve 44. The pilot valve 44 of this embodiment includes a poppet valve 58 arranged to seat with a pilot valve seat 60 associated with the fluid pilot passage 36 for its closure. The poppet valve 58 includes an actuation member 62 which on contact with the float member 38 unseats the poppet valve 58 from the valve seat 60. The pilot valve 44 of this example includes biasing means in the form of compression spring 64 which urges the poppet valve 58 into seated engagement with the valve seat 60 for closure of the pilot valve 44. The flow control valve 16 on filling of the vessel 12 is thus automatically closed according to the following sequence:

1. The fluid within the vessel 12 floods the float housing 40 via the fluid opening(s) such as 41A until the float member 38 is lifted due to the buoyancy force imparted on the float member 38 by the surrounding fluid;
2. Once the float member 38 is raised to a level such that the actuation member 62 is no longer held down by the float member 38, the pilot valve 44 closes under the influence of the spring 64 to prevent venting of the bleed fluid which is pressurised;
3. Closure of the pilot passage 36 linking the pilot valve 44 with the flow control valve 16 causes the fluid pressure on either side of the piston sub-assembly 32 to balance or equalise and the difference in the projected area either side of the piston sub-assembly 32 subsequently creates a force imbalance on the piston sub-assembly 32;
4. The force imbalance promotes axial displacement of the piston sub-assembly 32 for closure of the fluid outlet 26 resulting in an increase in pressure into the fluid inlet 24 causing automatic shut-off of the associated pressure-sensitive nozzle (see FIG. 5);
5. The refuelling nozzle, such as the refuelling nozzle 14 of FIG. 1b, is unlatched from the fluid receiver assembly 48 for closure of the fluid inlet 24 via the poppet valve 50.

FIG. 7 illustrates a second embodiment of the vessel overfill protection system 10. In this embodiment the flow control valve 16 is one of two flow control valves 16 and 16A operatively coupled to a common float control valve assembly 18. The float control valve assembly 18 is operatively coupled to respective of the flow control valves 16 and 16A via the fluid pilot port 54 or 54A and associated fluid pilot passage 36 or 36A. In the embodiment illustrated the flow control valve 16 is opened and controlled by the float control valve assembly 18 with the shuttle valve 56 exposing or opening the fluid pilot port 54 and isolating or closing the other fluid pilot port 54A. The other flow control valve 16A is thus inoperative until connection with a refuelling nozzle and control of this other flow control valve 16A is then influenced by the float control valve assembly 18 by automatic switching of the shuttle valve 56 for closure of the fluid pilot port 54 and opening of the other fluid pilot port 54A. The flow control valves 16/16A and the float control valve assembly 18 are otherwise of substantially the same construction as the preceding embodiment.

FIG. 8 illustrates another variation of the overfill protection system 10 where the flow control valve 16 is mounted remote from the vessel 12. The flow control valve 16 may in this embodiment include a flexible or rigid coupling tube 64 of varying length depending on the installation. The flow control valve 16 and the float control valve assembly 18 are otherwise of substantially the same construction as the preceding embodiments.

Figure 9:
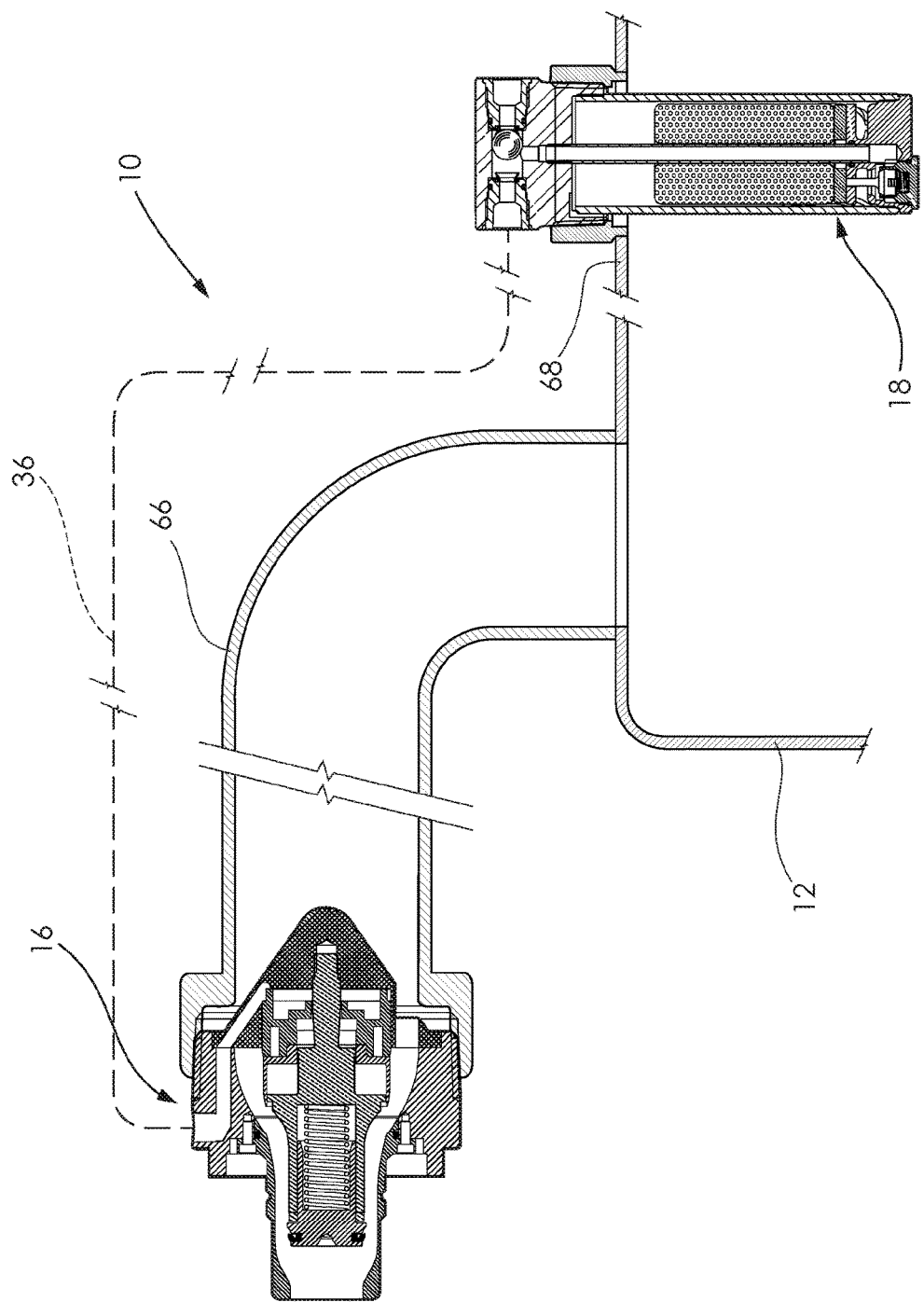
FIG. 9 is a fourth embodiment of a vessel overfill protection system with the flow control valve remote from the vessel and connected to its ceiling or roof.

FIG. 9 illustrates a further variation of the vessel overfill protection system 10 where the flow control valve 16 is connected remote from the vessel 12 via a flexible and/or rigid pipe 66. The pipe 66 is in this embodiment connected to a ceiling 68 or roof of the vessel 12. The flow control valve 16 and float control valve assembly 18 are otherwise of substantially the same construction as the preceding embodiments.

Figure 10:
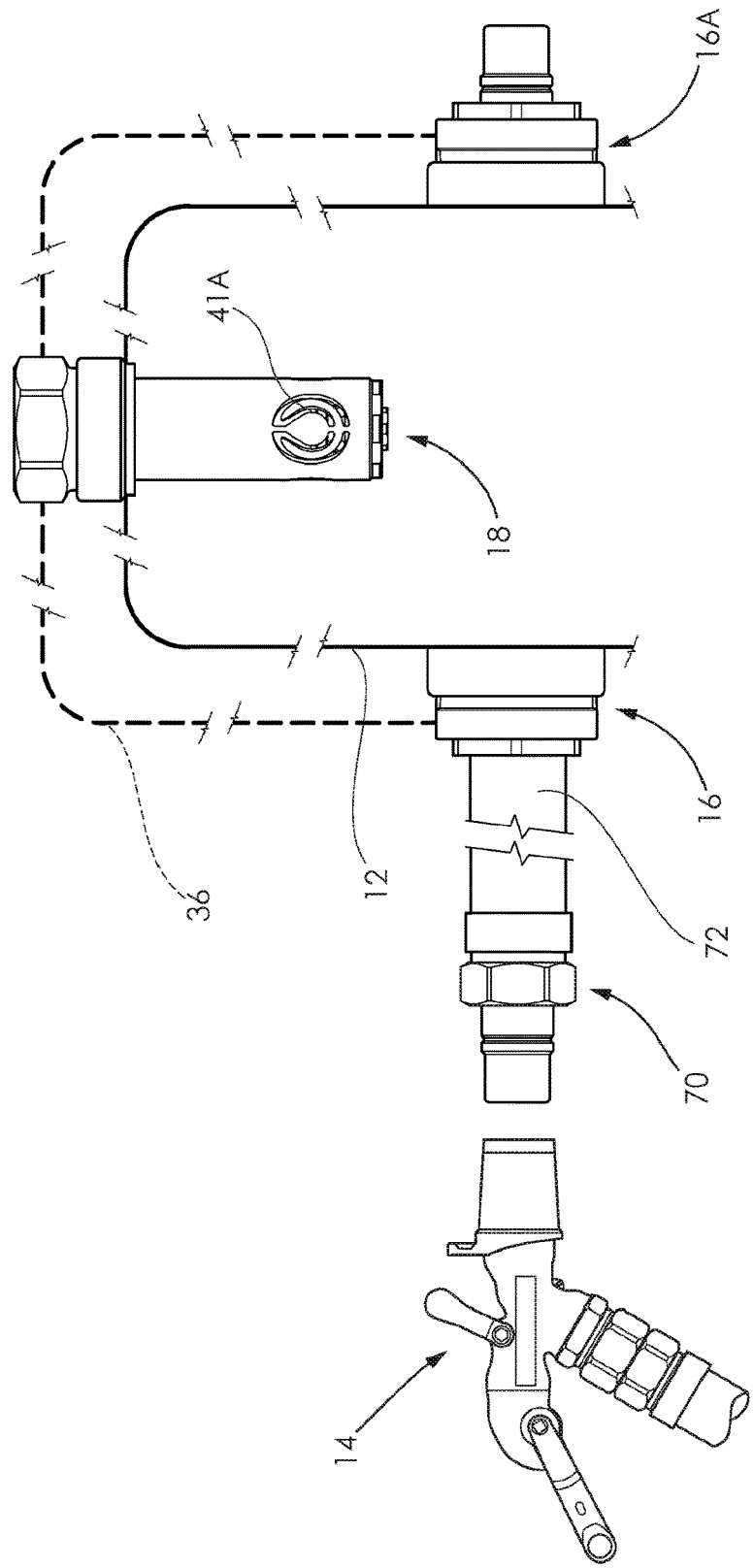
FIG. 10 is a fifth embodiment of a vessel overfill protection system having two flow control valves associated with the common float control valve assembly with one of the flow control valves separated from its fluid receiver assembly remote from the associated vessel.
Figure 11:
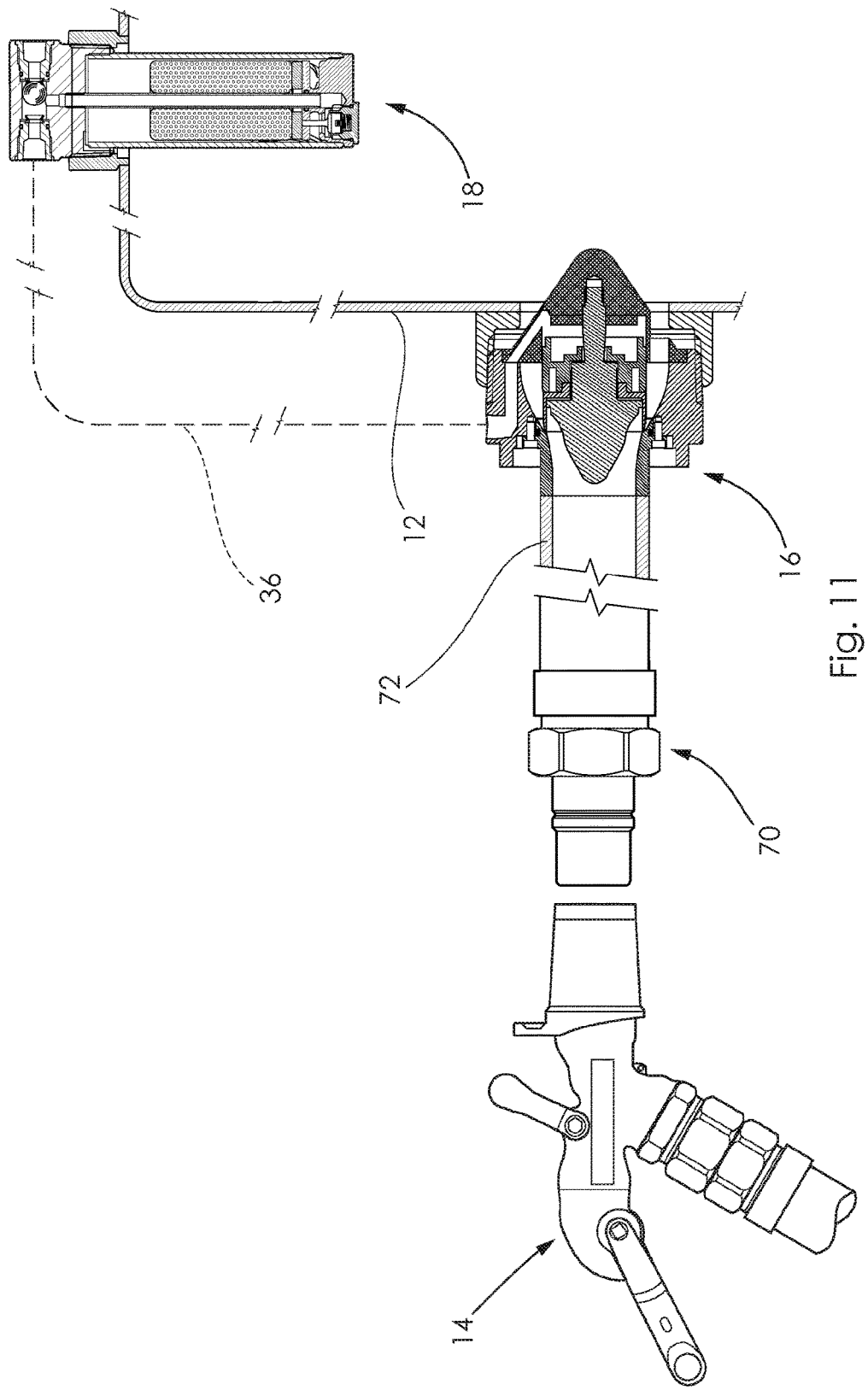
FIG. 11 is a part sectional view of the vessel overfill protection system of FIG. 10.
Figure 14C:
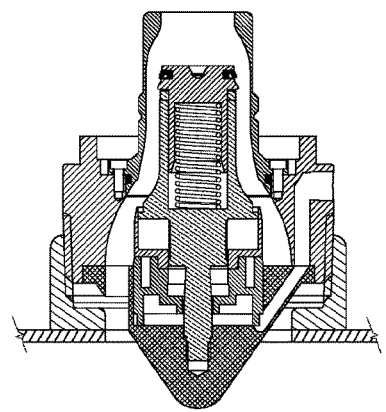
Figure 14B:
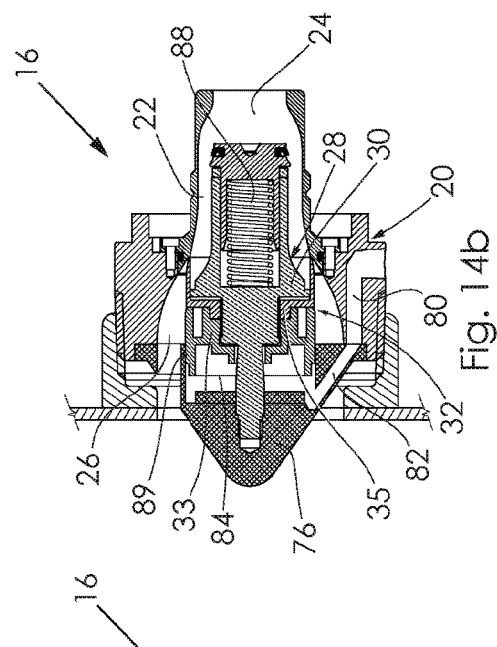
Figure 14D:
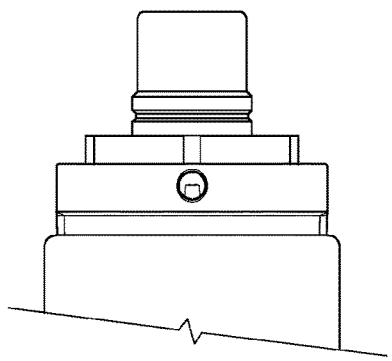
Figure 14A:
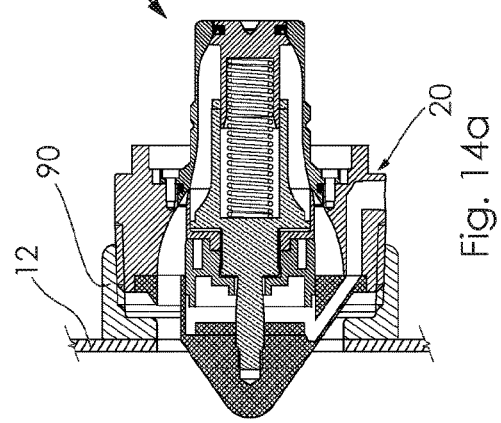

FIGS. 10 and 11 illustrate yet another variation on the vessel overfill protection system 10 where at least one of the flow control valves such as 16 associated with the vessel 12 is directly connected to the vessel 12 but remotely coupled to an associated fluid receiver assembly 70. The fluid receiver assembly 70 is coupled to the flow control valve 16 via an intermediate and adjoining flexible and/or rigid tube 72. The fluid receiver assembly 70 is otherwise conventionally designed for latching a refuelling nozzle such as the refuelling nozzle 14 of FIG. 1b and is similar in construction to the fluid receiver assembly 48 of the preceding embodiment. Likewise the flow control valve 16 and the float control valve assembly 18 are of substantially the same construction as the preceding embodiments. It is to be appreciated that significant proportion of implementations of the present invention will involve the fluid receiver assembly 70 (or fluid coupling) being mounted remotely and upstream of the flow control valve 16. It is also to be appreciated that not all "upstream fluid couplings" may be referred to as "receivers". The term "receiver", as used herein, refers to the male fluid coupling within the specific field of dry-break diesel refuelling. It is to be appreciated that other forms of fluid couplings could be substituted for the presently described and illustrated "receiver".

FIGS. 12a to 12h show various views of the flow control valve 16 taken from the system 10 of the preceding embodiments. The sectional views of FIGS. 12a to 12c respectively depict the flow control valve 16 in its:

1. normally closed or "idle" state without connection to a refuelling nozzle;
2. intermediate state with the fluid receiver assembly 48 opened on latching of the refuelling nozzle and the piston sub-assembly 32 is closed;
3. open state with both the receiver 48 and the piston sub-assembly 32 opened.

In addition to the components of the flow control valve 16 described in the context of the vessel overfill protection system 10 of the preceding embodiments, the flow control valve 16 also comprises:

1. Piston housing 76 connected to the valve body 20 and providing axial mounting for the piston support 30 at its downstream end;
2. The piston housing 76 together with the valve body 20 providing the fluid outlet 26 in the form of three circumferentially spaced outlet passages 78A to 78C (see FIGS. 12d, 12e and 12h);
3. A valve body pilot passage 80 formed continuous with a piston housing pilot passage 82 entering a piston chamber 84 downstream of the piston sub assembly 32;
4. A cylindrical bore 86 within the piston support 30 which slidably receives the poppet valve 50 which is biased closed by a compression spring 88;
5. A clearance passage 89 located between the piston mount 33 and the associated supporting surface of the piston housing 76 to reduce friction between these opposing surfaces.

The clearance passage 89 allows some fluid to bleed from the piston chamber 84 downstream of the piston sub assembly 32. Alternatively the clearance passage 89 may be sealed depending on the flow and other design parameters of the flow control valve 16 required to provide its effective opening and closure. Sealing of the clearance passage 89 may be effected by the provision of a piston seal (not shown) which is captured within the piston sub-assembly 32 or a rod seal (not shown) which is captured within the piston housing 76. In this variation the valve 16 may also include a spring (not shown) arranged to bias the piston-sub-assembly 32 closed. The clearance passage 89 can best be seen in FIGS. 15 and 16.

FIGS. 13a to 13d illustrate the flow control valve 16 of FIG. 12 connected remotely to a vessel such as 12 via a coupling tube 64. In this embodiment the valve body 20 is screw fastened to the coupling tube 64 although it will be understood that other connections are possible, for example a flanged connection. This remote connection is similar to that adopted in the installation of the embodiment of FIG. 8.

FIGS. 14a to 14d illustrate in more detail the flow control valve 16 connected directly to a fitting 90 welded or otherwise connected to the vessel 12. In this case the valve body 20 is screw fastened to the fitting 90 although it will be understood that other connections such as a flange mounting may also be appropriate. This direct connection is the same as that adopted in the installation of the earlier embodiment of FIGS. 1 to 7. The valve 16 may also be connected to an elbow fitting associated with the vessel, see for example FIG. 9.

Figure 15:
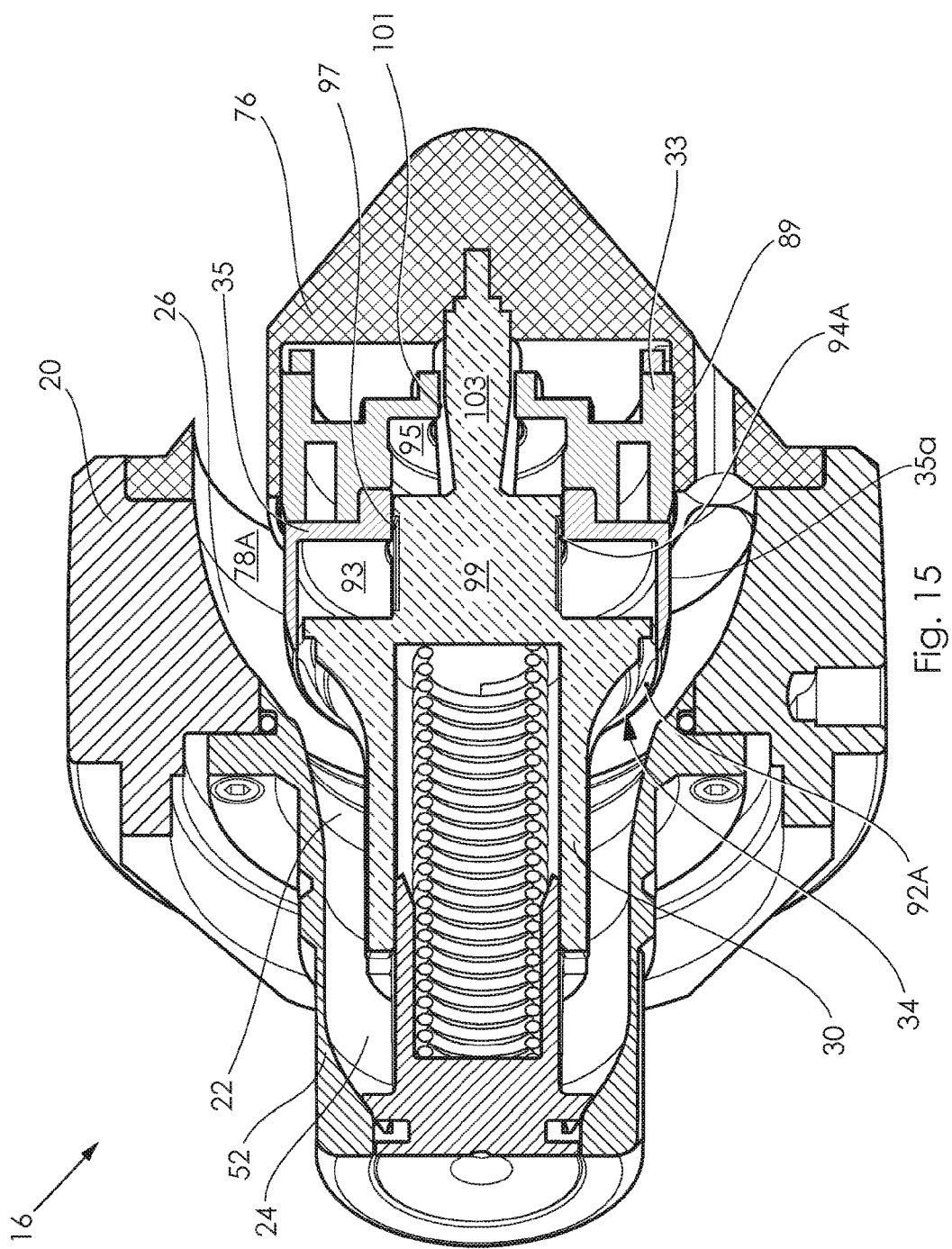
FIG. 15 is a perspective view in cross-section of the flow control valve of FIGS. 12 to 14.
Figure 16:
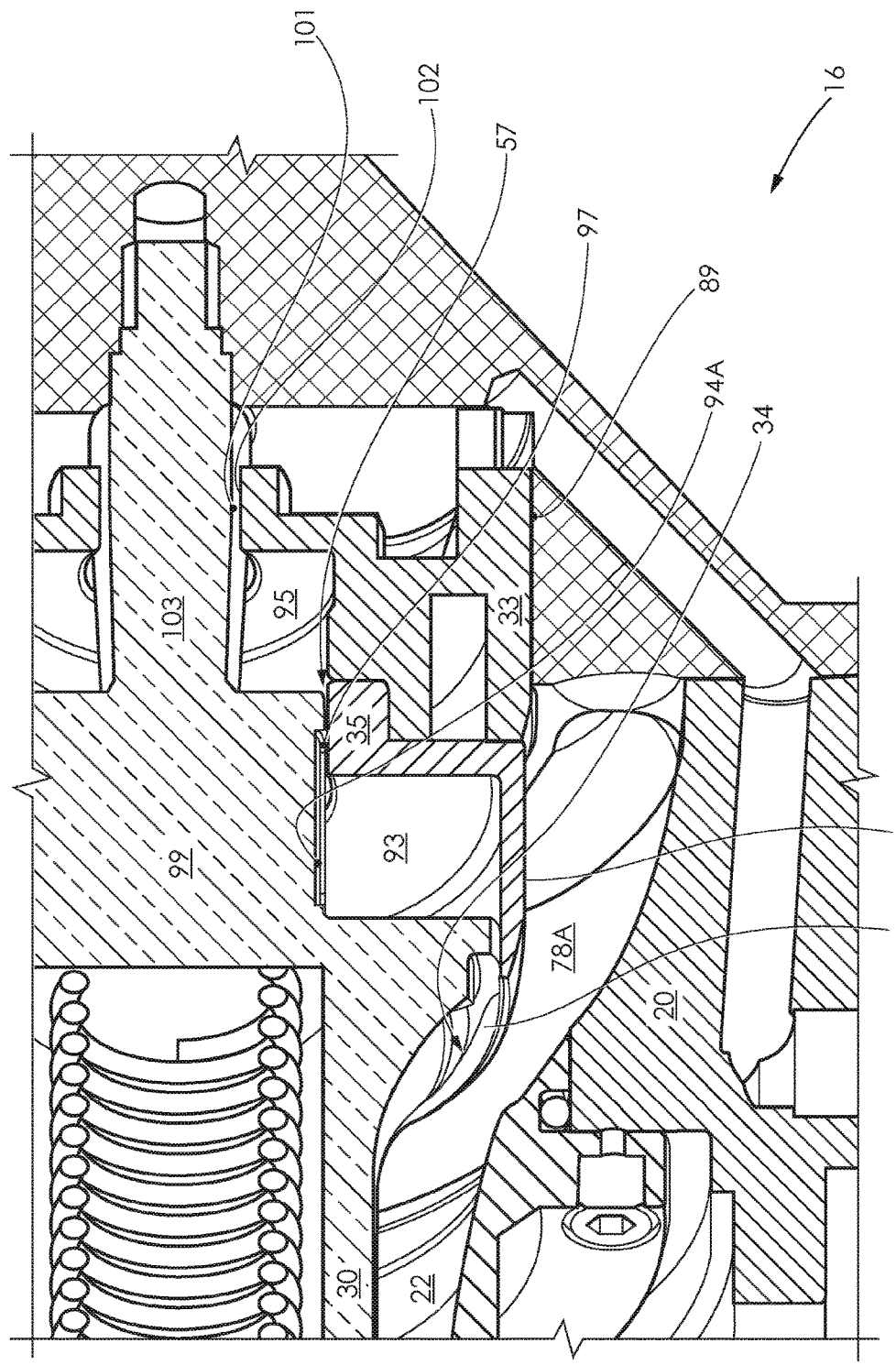
FIG. 16 is enlarged view of part of the sectional view of FIG. 15.
Figure 18C:
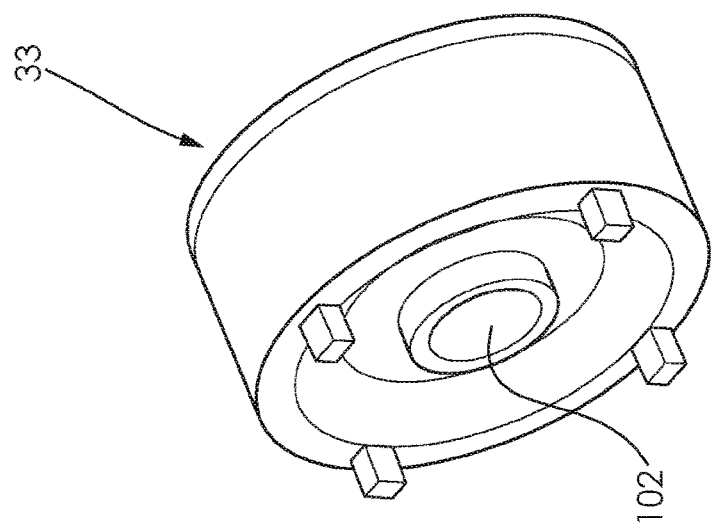
FIGS. 18a to 18c show various views of a piston mount of the piston sub-assembly taken from the flow control valve of FIG. 12.
Figure 18B:
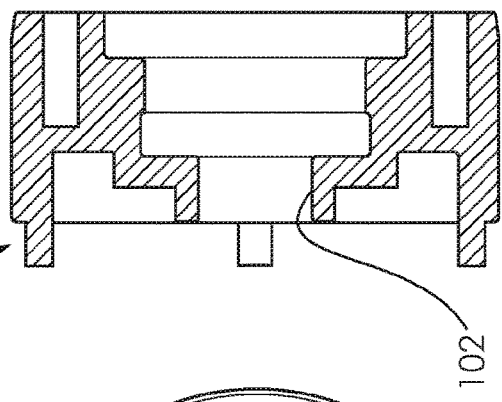
Figure 18A:
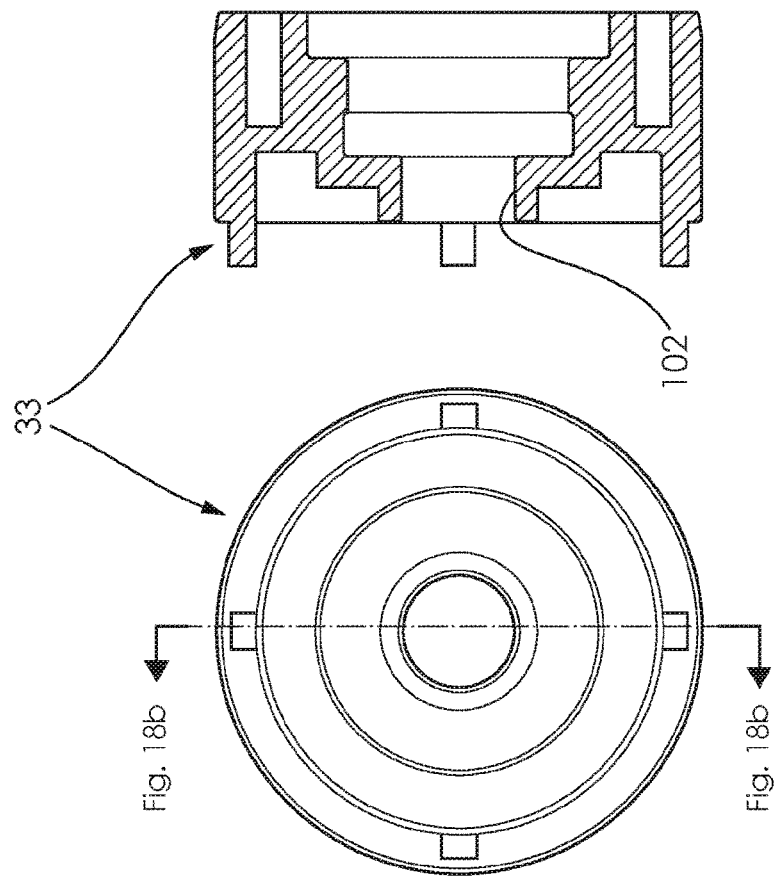
Figure 19C:
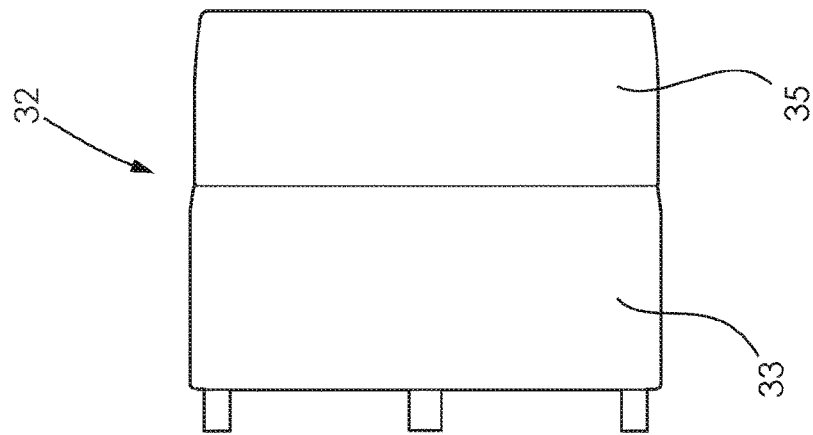
FIGS. 19a to 19c show various views of the piston sub-assembly including the components of FIGS. 17 and 18.
Figure 19B:
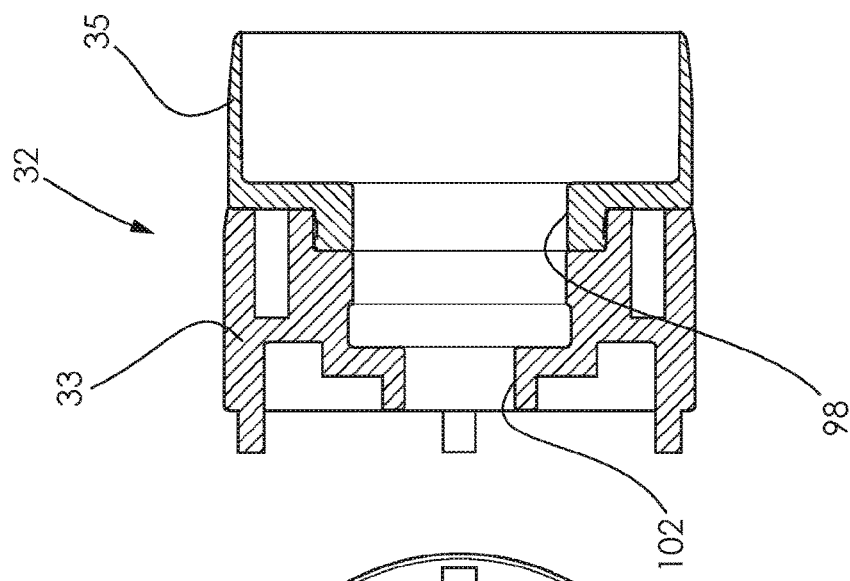
Figure 19A:
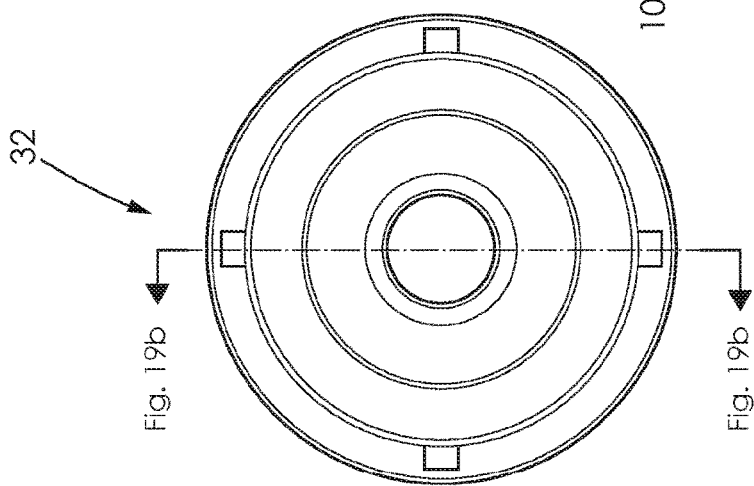

FIGS. 15 and 16 are intended to more clearly illustrate the various fluid passages associated with the flow control valve 16. For example, it can be seen that for this embodiment:
1. The fluid passageway 22 is generally defined by an annular space between the piston support 30 at its upstream end and the fluid receiver body 52;
2. The fluid outlet 26 is generally defined by circumferentially spaced and axially oriented passages such as 78A formed between the piston support 30 and the valve body 20;
3. The fluid sampling passage 34 is formed as circumferentially spaced channels such as 92A in the periphery of the piston support 30 located within the cup-shaped piston 35;
4. A first upstream fluid sampling chamber 93 is located within the cup-shaped piston 35, and a second upstream fluid sampling chamber 95 is located within the piston mount 33;
5. The bleed passage is formed (moving in a downstream direction) by a combination of (a) an upstream bleed passage 97 including (i) axially oriented slots or grooves such as 94A, as illustrated in FIG. 20, formed in an intermediate section 99 of the piston support 30, and (ii) an annular space between the intermediate section 99 of the piston support 30 and a surrounding surface 98, as illustrated in FIGS. 17a to 17c, of the piston 32, and (b) a downstream bleed passage 101 formed between a downstream section 103 of the piston support 30 and a surrounding surface 102, as illustrated in FIGS. 18a to 18c, of the piston mount 33.

In this embodiment the first upstream sampling chamber 93 bleeds to the second upstream sampling chamber 95 via the upstream bleed passage 97. The second upstream sampling chamber 95 bleeds to a downstream side of the piston sub-assembly 32 via the downstream bleed passage 101. The downstream section 103 is tapered outward in a downstream direction so that it is generally frusto-conical in shape. This means the bleed passage 101 is variable in its size or aperture opening depending on the relative position of the piston sub-assembly 32. The area of the bleed passage 101 changes due to the controlled variations in clearances between the downstream section 103 of the piston support 30 and the surrounding surface 102 of the piston mount 33 depending on the position of the piston sub-assembly 32 with respect to the piston support 30. It will be understood that the bleed passage 101 is maximum in size with the piston sub-assembly 32 closed and progressively reduces in size as the sub-assembly 32 axially moves toward its open position. This design assists the fluid pressure imbalance across the piston sub-assembly 32 as it moves toward the open position. The relatively large bleed passage 101 serves to rapidly equalise the fluid pressure across the piston sub-assembly 32 with minimal resistance as the piston sub-assembly 32 moves towards the closed position. Thus, as the piston sub-assembly 32 approaches the closed position the associated rapid equalisation of the fluid pressure across the piston sub-assembly 32 ameliorates any propensity for the piston sub-assembly 32 to remain partially open. The piston mount 33 also includes an annular groove 105 which with the piston sub-assembly 32 closed surrounds intermediate section 99 of the piston support 30 to assist in rapid equalisation of pressure across the piston sub-assembly 32.

FIGS. 15 to 21 illustrate various components of the piston assembly 28 including:
1. The piston 35 which is cup-shaped and together with the intermediate section 99 of the piston support 30 defines or forms both the first upstream sampling chamber 93 and the upstream bleed passage 97 (see FIGS. 15 to 17);
2. The piston mount 33 which secures to the piston 35 and together with the downstream section 103 of the piston support 30 defines or forms both the second upstream sampling chamber 95 and the downstream bleed passage 101 (see FIGS. 15, 16 and 18);
3. The piston sub-assembly 32 which includes the piston 35 and the piston mount 33 secured together (see FIGS. 19a to 19c);
4. The piston support 30 and in particular the channels 92A to 92D formed about the outermost periphery of the support 30 forming the fluid sampling passages 34 (see FIGS. 16 and 20); and
5. The slots or grooves such 94A formed in the intermediate section 99 of the piston support 30 which in part forms the upstream bleed passage 97 (see FIGS. 16 and 20);
6. The generally conical-shaped piston housing 76 forming an extension of the axially oriented outlet passages 78A to 78C together with the piston housing pilot passage 82 (see FIGS. 21a to 21c).

Figure 22A:
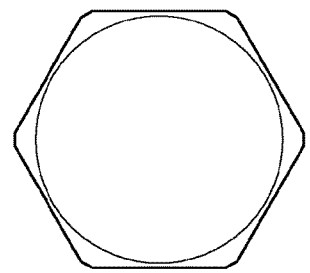
FIGS. 22a to 22c illustrates various views of a float control valve assembly according to a further aspect of the invention taken from the system of any one of FIGS. 1 to 11.
Figure 22B:
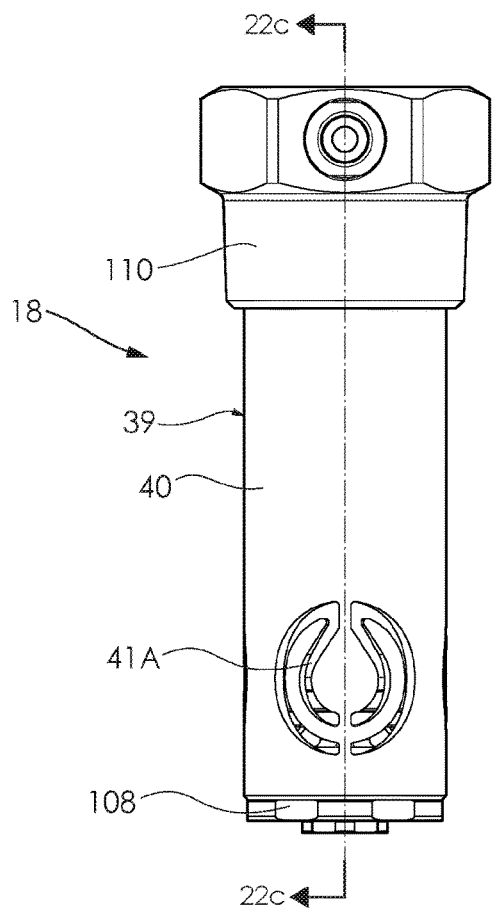
Figure 22C:
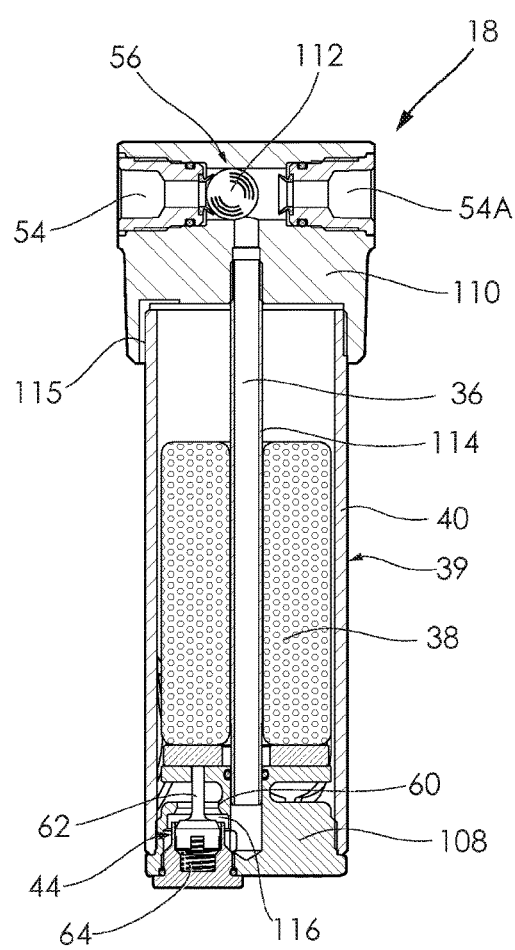

FIGS. 22a to 22c illustrate various views of the float control valve assembly 18 taken from the vessel overfill protection system 10 of the preceding embodiments. The float control valve assembly 18 includes the fluid opening such as 41A in the perimeter wall of the float housing 40. The fluid opening 41A in this example is one of series of fluid openings located at substantially the same level in its perimeter wall. The fluid opening 41A is in profile shaped in the general form of an oil drop and is intended to represent the applicant's business logo.

The float assembly body 39 includes a pair of closure members 108/110 located at respective ends of the cylindrical-shaped float housing 40. The fluid pilot ports 54 and 54A are formed in the upper closure member 110 which houses the shuttle valve 56 including the ball 112. The ports 54/54A define respective seats for sealing with the ball 112 to provide closure of either of the pilot ports 54 or 54A. The float control valve assembly 18 includes an axial tube 114 about which the float member 38 is slidably mounted. The axial tube 114 provides bleed fluid communication via part of the pilot passage 36 between the selected pilot port 54 or 54A and the pilot valve 44 located within the lower closure member 108. The lower closure member 108 includes a bleed chamber 116 located generally upstream of the valve seat 60 which is formed in the lower closure member 108. The bleed chamber 116 is located eccentrically within the lower closure member 108 and is in fluid communication with the pilot passage via a break-through bleed passage 107 and a bleed cavity 109 (see FIGS. 22a to 22c). The bleed cavity 109 is concentric with the pilot passage 36.

In this embodiment the float assembly body 39 includes a breather passage 115 designed to permit air flow from and to the float housing 40 on lifting (floating) and lowering of the float member 38. It will be understood that with the fluid openings such as 41A at the same level the breather passage 115 is required to permit both i) venting of the housing 40 for the escape of air which would otherwise be trapped in the upper section of the housing 40 during lifting of the float member 38, ii) the ingress of air into the housing 40 from the surrounding vessel space to relieve the vacuum which would otherwise build up within the housing 40 on lowering of the float member 38. The float member 38 is thus free to rise and fall within the upper section of the housing 40 with the surrounding air escaping and entering the housing 40 via the breather passage 115. In this example the breather passage 115 is formed by one or more axially-oriented grooves formed in an inner surface of the upper closure member 110.

Figures 23A, 23B:
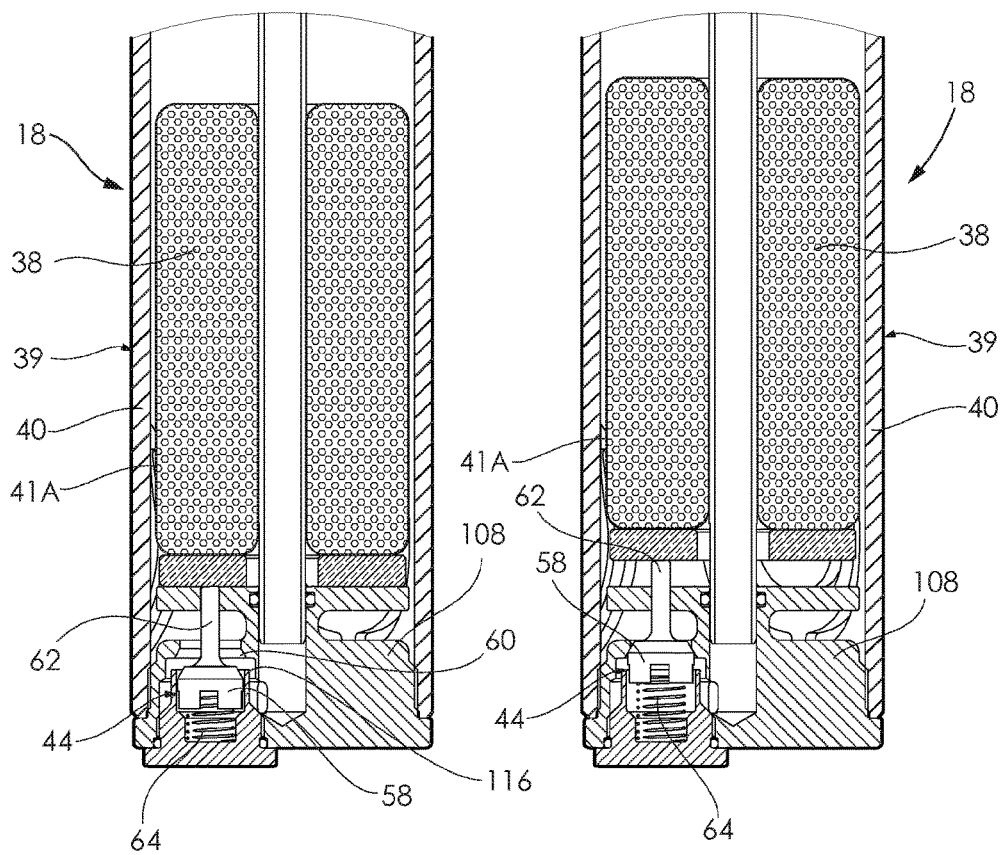
FIGS. 23a and 23b is a sectional view of the float control valve assembly of FIG. 22 showing the float member in its "down" and "up" positions with the pilot valve in the open and closed positions, respectively.

FIGS. 23a and 23b illustrates the float control valve assembly 18 in its two modes of operation where the float member 38 is either "down" or "up". In FIG. 23a the float member 38 is shown "down" which will be its state when the associated vessel 12 is being filled. The actuation member 62 of the pilot valve 44 is urged downward by contact with the float member 38 against the biasing pressure of the compression spring 64. The actuation member 62 is formed integral with the poppet valve 58 which is thus unseated from the valve seat 60 for opening of the pilot valve 44. This means bleed fluid from the associated flow control valve such as 16 is free to bleed into the float housing 40 via the fluid pilot passage 36 and subsequently into the vessel 12 via the fluid opening(s) 41.

FIG. 23b shows the float member 38 in its upward position which occurs when the associated vessel 12 reaches its safe fill level. The float member 38 releases the actuation member 62 of the pilot valve 44 which allows the spring 64 to seat the poppet valve 58 against the seat 60 and close the pilot valve 44. This means the bleed fluid from the associated flow control valve 16 is prevented from bleeding into the float housing 40 via the fluid pilot passage 36. The bleed fluid in the pilot passage 36 substantially equalises the fluid pressure across the piston sub-assembly 32. The piston sub-assembly 32 is configured with its larger projected area on its downstream side relative to its upstream side and therefore a force imbalance is provided across the piston sub-assembly 32 which is effective in closure of the flow control valve 16.

FIGS. 24 and 25 illustrate variations on the float control valve assembly 18 where circumferentially spaced and axially oriented slots such as 120A and 120B formed in the float housing 40 provide fluid openings for the passage of fluid into the housing 40 to float the float member 38. Importantly the slots are located at substantially the same level in the perimeter wall of the housing 40. Otherwise the float control valve assembly is effectively of the same construction as the preceding embodiment although the pilot valve 44 is shaped different.

In these embodiments of the float control valve assembly the pilot valve 44 is closed with the float member 38 raised above the actuation member 62. The spring 64 promotes seating of the poppet valve 58 against the associated valve poppet seat 60. This "closed" mode for the float control valve assembly 18 will occur once the tank is filled to the required level. It will be understood that in this "closed" mode the bleed fluid provides the force imbalance across the piston sub-assembly 32 which is effective in closure of the associated flow control valve 16. The float control valve assembly 18 is in its "open" mode in the course of filling the associated vessel 12. The float member 38 contacts the actuation member 62 to unseat the poppet valve 58 from the poppet seat 60 for opening of the pilot valve 44. It will be understood that in this "open" mode the bleed fluid is bled into the float housing 40 providing a fluid pressure imbalance across the piston sub-assembly 32 of the associated flow control valve 16. This pressure imbalance means the flow control valve 16 will remain open during filling of the vessel 12.

Figure 26:
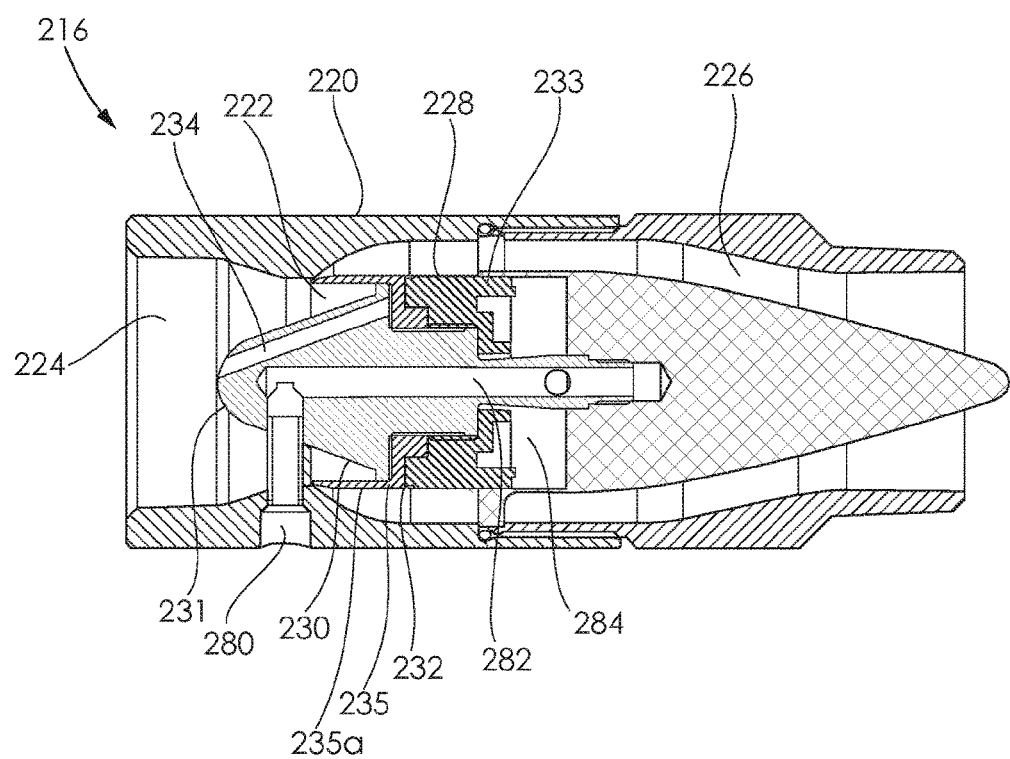
FIG. 26 illustrates a sectional view of another embodiment of the flow control valve which is separated from a fluid receiver assembly (not shown)

FIG. 26 illustrates a sectional view of another embodiment of the flow control valve 216 which is separated from a fluid receiver assembly (not shown). The flow control valve 216 may be remotely connected to the vessel (not shown) and remotely coupled to an associated fluid receiver assembly (not shown). The fluid receiver assembly (not shown) is coupled to the flow control valve 216 via an intermediate and adjoining flexible and/or rigid tube (not shown). Otherwise, the flow control valve 216 may be configured for direct connection of a refuelling nozzle. The fluid receiver assembly (not shown) is otherwise conventionally designed for latching a refuelling nozzle such as refuelling nozzle 14 illustrated in FIG. 1b and is similar in construction to the fluid receiver assembly 48 of the preceding embodiments. Likewise the flow control valve 16 is adapted for operation with the float control valve assembly 18 of the preceding embodiments.

The flow control valve 216 includes a valve body 220 which defines a fluid passageway 222 disposed between a fluid inlet 224 and a fluid outlet 226. The flow control valve 216 also includes a piston assembly 228 located partly within the fluid passageway 222. The piston assembly 228 includes a piston support 230 to which a piston sub-assembly 232 is slidably mounted for opening and closure of the fluid outlet 226. The piston sub-assembly 232 includes a piston mount 233 secured coaxial with a piston 235. Importantly the piston support 230 includes one or more fluid sampling passages 234 that are arranged to provide pressurised fluid from the fluid inlet 224 to an upstream surface of the piston 235. The pressurised fluid is also provided to an upstream surface of the piston mount 233. The fluid pressure on the projected upstream surfaces of the piston sub-assembly 232 is higher than the fluid pressure on the downstream side of the piston sub-assembly 232. This pressure imbalance urges the piston sub-assembly 232 open to expose the fluid outlet 226. This permits flow of fluid through the fluid passageway 222 exiting the fluid outlet 226. In contrast to previous embodiments, the one or more fluid sampling passages 234 could be configured with an upstream opening located towards the central axis of the piston support 230 at which the piston support includes a hydro-dynamically optimised nose 231 portion. A valve body pilot passage 280 is formed continuous with a piston housing pilot passage 282 entering a piston chamber 284 downstream of the piston sub assembly 232.

The flow control valve 216 on filling of the vessel (not shown) automatically closes in response to the float control valve assembly (not shown) closing the pilot passage (not shown) linking the float control valve assembly with the flow control valve 216 thereby causing the fluid pressure on either side of the piston sub-assembly 232 to balance or equalise. A difference in the projected area either side of the piston sub-assembly 232 subsequently creates a force imbalance on the piston sub-assembly 232 promoting axial displacement of the piston sub-assembly 232 for closure of the fluid outlet 226.

The piston support 230 has an outer surface at an upstream portion, including the nose portion 231, being generally conical or frustoconical in shape (i.e. flared outwardly) which along with an outside perimeter wall 235*a* of the piston 235 defines, at least in part, a wall of the fluid passageway 222 which is streamlined to promote a substantially laminar, or laminar-like, flow, with minimal turbulence, through reduced obstruction to the flow of fluid through the fluid passageway 222.

Now that several preferred embodiments of the invention have been described in some detail it will be apparent to those skilled in the art that the vessel overfill protection system and the associated flow control valve and float control valve assembly have at least the following advantages:
1. The flow control valve lends itself to relatively high flowrates without risk of premature nozzle shut-off by reducing or minimising resistance to fluid flow;
2. The flow control valve is of a tamper-proof design;
3. The system provides effective control for automatic closure of the flow control valve to minimise the likelihood of overfilling the associated vessel;
4. The system provides safe refilling of the vessel, particularly at high flowrates, without causing pressurisation of the vessel;
5. The flow control valve can function with a variety of float control valve assemblies and vice versa;
6. The flow control valve and/or float control valve assemblies can be retrofitted to existing installations;
7. The system and its components lend themselves to a variety of fluids of differing viscosities and other fluid properties.

Those skilled in the art will appreciate that the invention described herein is susceptible to variations and modifications other than those specifically described. For example, the construction of the flow control valve or float control valve assembly may vary provided it functions as broadly defined. The flow control valve need not be limited to its use with a pressure-sensitive refilling nozzle which provides automatic shut-off but also extends to use with manual shut-off refilling nozzles. The overfill protection system need not be limited to the float control valve assembly described but extends to other float control assemblies which effectively cut-off or isolate the fluid pilot passage. The system may be configured where in the case of two (2) flow control valves both valves are used alternately under the control of a common float control valve assembly. The flow control valve may include one or more strainers or filters to remove oversize solids from contaminated liquids, such as fuel, in the course of refilling. The strainer/filter may for example be housed within the fluid inlet of the flow control valve.

All such variations and modifications are to be considered within the scope of the present invention the nature of which is to be determined from the foregoing description.

The invention claimed is:
1. A flow control valve comprising:
a valve body defining a fluid passageway disposed between a fluid inlet and a fluid outlet;
a piston assembly located at least in part within the fluid passageway, the piston assembly including a piston support to which a piston sub-assembly is slidably mounted for opening and closure of the fluid outlet, the piston support including at least one fluid sampling passage arranged to provide pressurised fluid from the fluid inlet to an upstream surface of the piston sub-assembly, said upstream surface being urged by the pressurised fluid to provide opening of the fluid outlet to permit flow of fluid through the fluid passageway;
a bleed passage including at least one annular space between the piston sub-assembly and the piston support, said bleed passage disposed between the piston sub-assembly and the piston support downstream of the fluid sampling passage;
a pilot fluid passage at least in part located within the valve body, said pilot passage at one end in fluid communication with bleed fluid associated with the bleed passage and located proximal a downstream surface of the piston sub-assembly and at an opposite end in fluid communication with a float control assembly whereby in operation i) closure of the pilot fluid passage causes substantial equalisation of fluid pressure on the upstream and the downstream surfaces of the piston sub-assembly having respective upstream and downstream projected surfaces of different areas creating a force imbalance across the piston sub-assembly being effective in closure of the fluid outlet, and ii) opening of the pilot fluid passage allows the bleed fluid to be bled to the downstream surface of the piston sub-assembly via the bleed passage to effect a fluid pressure imbalance across the piston sub-assembly for opening of the fluid outlet.

2. The flow control valve of claim 1, wherein said at least one fluid sampling passage includes a plurality of sampling passages formed about a periphery of the piston support.

3. The flow control valve of claim 1, wherein the bleed passage includes one or more slots or grooves formed in the piston support.

4. The flow control valve of claim 1, wherein the downstream projected surface area is greater than the upstream projected surface area of the piston sub-assembly thereby providing the force imbalance for closure of the fluid outlet via the piston sub-assembly.

5. The flow control valve of claim 1, wherein the flow control valve operates without biasing means assisting closure of the fluid outlet via the piston sub-assembly.

6. The flow control valve of claim 1, wherein the flow control valve is adapted to couple to a fluid receiver assembly located upstream and remotely from the flow control valve.

7. The flow control valve of claim 1, wherein the sampling passages are at least in part defined by respective channels formed in the periphery of the piston support.

8. The flow control valve of claim 7, wherein the sampling passages are each defined by the respective channels together with an inner circumferential surface of the piston.

9. The flow control valve of claim 1, wherein the piston sub-assembly includes a piston slidably mounted to the piston support relative to an open position in which the fluid outlet is open.

10. The flow control valve of claim 9, wherein the piston is slidably mounted to the piston support relative to the open position in which the piston is substantially out of the flow path of fluid through the fluid passageway.

11. The flow control valve of claim 1, wherein the fluid outlet is at least in part defined at an upstream portion by an annular space between the piston support and the valve body, and at a downstream portion by an annular space between the piston sub-assembly and the valve body.

12. The flow control valve of claim 11, wherein the fluid outlet is also partly defined by axially oriented passages formed in the valve body and a piston housing associated with the piston support downstream of the annular space.

13. The flow control valve of claim 1, wherein the flow control valve further comprises a fluid receiver assembly mounted to the valve body proximal the fluid inlet.

14. The flow control valve of claim 13, wherein the fluid receiver assembly includes a fluid receiver body within which a normally-closed poppet valve is slidably mounted to the piston support and adapted to be axially displaced and opened by a fluid filling nozzle.

15. A vessel overfill protection system comprising:
  a) a flow control valve adapted to operatively couple to a vessel to be filled with fluid, said flow control valve including:
    a valve body defining a fluid passageway disposed between a fluid inlet and a fluid outlet operatively coupled to the vessel;
    a piston assembly located at least in part within the fluid passageway, the piston assembly including a piston support to which a piston sub-assembly is slidably mounted for opening and closure of the fluid outlet, the piston support including at least one fluid sampling passage arranged to provide pressurised fluid from the fluid inlet to an upstream surface of the piston sub-assembly , said upstream surface being urged by the pressurised fluid to provide opening of the fluid outlet to permit flow of fluid through the fluid passageway into the vessel;
    a bleed passage including at least one annular space between the piston sub-assembly and the piston support, said bleed passage disposed between the piston sub-assembly and the piston support downstream of the fluid sampling passage;
  b) a float control valve assembly adapted to mount to the vessel and being operatively coupled to the flow control valve via a pilot fluid passage to control opening and closure of the flow control valve:
  c) the pilot fluid passage at least in part located within the valve body, said pilot passage at one end in fluid communication with bleed fluid associated with the bleed passage and located proximal a downstream surface of the piston sub-assembly and at an opposite end in fluid communication with the float control valve assembly whereby in operation i) closure of the pilot fluid passage via the float control valve assembly causes substantial equalisation of fluid pressure on the upstream and the downstream surfaces of the piston sub-assembly having respective upstream and downstream projected surfaces of different areas creating a force imbalance across the piston sub-assembly being effective in closure of the fluid outlet, and ii) opening of the pilot fluid passage via the float control valve assembly allows the bleed fluid to be bled to the downstream surface of the piston sub-assembly via the bleed passage to effect a fluid pressure imbalance across the piston sub-assembly for opening of the fluid outlet.

16. The vessel overfill protection system of claim 15, wherein the float control valve assembly includes:
    a float assembly body including a float housing having at least one fluid opening in its perimeter wall;
    a float member slidably located within the float housing and arranged to float on flooding of the float housing with fluid from the vessel via the fluid openings;
    a pilot valve operatively coupled to the float assembly body;
    the pilot valve arranged to cooperate with the float member for closure of the pilot fluid passage on flooding of the float housing to promote closure of the flow control valve via the piston sub-assembly.

17. The vessel overfill protection system of claim 16, wherein the at least one fluid opening in the perimeter wall of the float housing is either a single fluid opening or a series of fluid openings at substantially the same level.

\* \* \* \* \*